US010513393B2

(12) United States Patent
Salih et al.

(10) Patent No.: US 10,513,393 B2
(45) Date of Patent: Dec. 24, 2019

(54) HORIZONTAL STORAGE MODULE, CARRIAGE ASSEMBLY, AND CANISTER TRANSFER ASSEMBLIES

(71) Applicant: TN AMERICAS LLC, Columbia, MD (US)

(72) Inventors: Ahmad E. Salih, Columbia, MD (US); Uwe Wolf, Silver Spring, MD (US); Aleksandr Kofman, Rockville, MD (US); Anthony Payumo Villaflores, Laurel, MD (US)

(73) Assignee: TN Americas LLC, Columbia, MD (US)

( * ) Notice: Subject to any disclaimer, the term of this patent is extended or adjusted under 35 U.S.C. 154(b) by 244 days.

(21) Appl. No.: 15/365,327

(22) Filed: Nov. 30, 2016

(65) Prior Publication Data

US 2017/0152105 A1    Jun. 1, 2017

Related U.S. Application Data

(60) Provisional application No. 62/260,791, filed on Nov. 30, 2015.

(51) Int. Cl.
*B65G 1/04* (2006.01)
*B65D 88/74* (2006.01)
(Continued)

(52) U.S. Cl.
CPC ........... *B65G 1/0442* (2013.01); *B65D 88/74* (2013.01); *B65D 90/0053* (2013.01); *B65D 90/0066* (2013.01); *B65D 90/02* (2013.01)

(58) Field of Classification Search
CPC .............................. G21F 5/015; B65G 1/0442
See application file for complete search history.

(56) References Cited

U.S. PATENT DOCUMENTS 4,780,269 A * 10/1988 Fischer ................. G21C 19/07
                                                        220/23.87
4,845,372 A * 7/1989 Mallory ..................... G21F 9/36
                                                        250/506.1
(Continued)

FOREIGN PATENT DOCUMENTS

CN      201647539 U     11/2010
DE       4336421 A1      6/1995
(Continued)

OTHER PUBLICATIONS

International Search Report and Written Opinion dated Mar. 24, 2017, issued in corresponding International Application No. PCT/US2016/064246, filed Nov. 30, 2016, 14 pages.
(Continued)

*Primary Examiner* — Jonathan Snelting
(74) *Attorney, Agent, or Firm* — Christensen O'Connor Johnson Kindness, PLLC

(57) ABSTRACT

A horizontal storage module (HSM) includes a body defining a plurality of compartments configured for receiving canisters, wherein the compartments are arranged in a first row at a first elevation and a second row at a second elevation higher than the first elevation, and wherein at least a portion of one compartment in the first row is in the same horizontal axis location as at least a portion of one compartment in the second row. A method of manufacturing the HSM includes positioning adjacent segments. A carriage assembly for the HSM includes a frame and an actuation means for lifting a cask containing a canister. A method of lifting includes receiving a cask and lifting a cask for delivery of the canister to the HSM.

16 Claims, 25 Drawing Sheets

(51) Int. Cl.
  *B65D 90/00*   (2006.01)
  *B65D 90/02*   (2019.01)

(56) References Cited

U.S. PATENT DOCUMENTS

| | | | |
|---|---|---|---|
| 6,164,883 A * | 12/2000 | Wilcox | B65G 1/0442 |
| | | | 410/32 |
| 2009/0159550 A1 | 6/2009 | Singh et al. | |
| 2014/0017051 A1 | 1/2014 | Coogan et al. | |
| 2014/0042159 A1 | 2/2014 | Salih | |

FOREIGN PATENT DOCUMENTS

| | | |
|---|---|---|
| EP | 0072356 A1 | 2/1983 |
| JP | 2000-56071 A | 2/2000 |
| JP | 2004069591 A | 3/2004 |
| JP | 2005331359 A | 12/2005 |
| KR | 101569874 B1 | 11/2015 |
| RU | 2069395 C1 | 11/1996 |
| WO | 2014/028402 A1 | 2/2014 |

OTHER PUBLICATIONS

International Preliminary Report on Patentability dated Jun. 14, 2018, issued in corresponding International Application No. PCT/US2016/064246, filed Nov. 30, 2016, 9 pages.
Communication Pursuant to Article 94(3) EPC dated Aug. 16, 2018, issued in corresponding European Application No. 15197150.4, filed Nov. 30, 2015, 7 pages.
Extended European Search Report dated Aug. 17, 2016, issued in corresponding European Application No. 15197150.4, filed Nov. 30, 2015, 18 pages.

* cited by examiner

HORIZONTAL STORAGE MODULE, CARRIAGE ASSEMBLY, AND CANISTER TRANSFER ASSEMBLIES

CROSS-REFERENCE TO RELATED APPLICATION

This application claims the benefit of U.S. Provisional Application No. 62/260,791, filed Nov. 30, 2015, the disclosure of which is hereby expressly incorporated by reference in its entirety.

BACKGROUND

Horizontal storage modules (HSMs) are typically used for the dry storage and containment of radioactive materials as ventilated canister storage systems at reactor or other storage sites. Previously designed HSMs are generally manufactured from reinforced concrete as a single body unit with an attachable lid or a roof atop. These HSMs may have dimensions of about 16-20 feet in height, by about 8-10 feet in width and about 20-22 feet in length. The weight of these single body unit HSMs can be around 300,000 lbs (145,000 kgs) (unloaded, i.e., without the canister). The footprint limits storage facility capabilities.

HSM units are typically constructed at a manufacturing site in two pieces (base and lid or roof). The pieces are then shipped to a reactor or storage site for use. Due to shipping regulations, single body unit HSMs must be shipped by rail or barge. In view of the size and weight, the shipping costs for such large, heavy unit HSMs have become very high and, in some cases, cost prohibitive.

There exists a need for an improved HSM design having a smaller footprint to expand storage facility capabilities. In addition, there exists a need for a modular HSM that can be constructed on site. Further, there exists a need for improved access and handling of canisters being transferred to and from HSMs. Embodiments of the present disclosure are directed to fulfilling these and other needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a horizontal storage module (HSM) is provided. The HSM includes a body defining a plurality of compartments configured for receiving canisters, wherein the compartments are arranged in a first row at a first elevation and a second row at a second elevation higher than the first elevation, and wherein at least a portion of one compartment in the first row is in the same horizontal axis location as at least a portion of one compartment in the second row.

In accordance with another embodiment of the present disclosure, a method of constructing an HSM assembly is provided. The method includes forming a plurality of segments for the body portion of the HSM assembly; and positioning adjacent segments.

In accordance with another embodiment of the present disclosure, a carriage assembly for a high-density horizontal storage module (HSM) is provided. The HSM includes a body defining a plurality of compartments configured for receiving canisters, wherein the compartments are arranged in a first row at a first elevation and a second row at a second elevation higher than the first elevation, and wherein at least a portion of one compartment in the first row is in the same horizontal axis location as at least a portion of one compartment in the second row. The carriage assembly includes a frame assembly, and actuation means for lifting a cask containing a canister for delivery to the second row at the second elevation.

In accordance with another embodiment of the present disclosure, a carriage assembly for a high-density horizontal storage module (HSM) is provided. The HSM includes a body defining a plurality of compartments configured for receiving canisters, wherein the compartments are arranged in a first row at a first elevation and a second row at a second elevation higher than the first elevation, and wherein at least a portion of one compartment in the first row is in the same horizontal axis location as at least a portion of one compartment in the second row. The carriage assembly includes a frame assembly; and an actuation system for lifting a cask containing a canister for delivery to the second row at the second elevation.

In accordance with another embodiment of the present disclosure, a method of loading a canister in a high-density horizontal storage module (HSM) is provided. The HSM includes a body defining a plurality of compartments configured for receiving canisters, wherein the compartments are arranged in a first row at a first elevation and a second row at a second elevation higher than the first elevation, and wherein at least a portion of one compartment in the first row is in the same horizontal axis location as at least a portion of one compartment in the second row. The method includes receiving a cask containing a canister in a frame assembly of a carriage assembly at the first elevation, and lifting the cask containing the canister for delivery of the canister to the second row at the second elevation.

In any of the embodiments described herein, the HSM may further include ventilation means in each of the plurality of compartments including vent paths having substantially vertical pathways.

In any of the embodiments described herein, each compartment may be adjacent at least two other compartments, preferably adjacent to at least three other compartments, and preferably adjacent to at least four other compartments.

In any of the embodiments described herein, each compartment may be polygonal in cross-sectional shape.

In any of the embodiments described herein, at least some of the compartments may be hexagonal in cross-sectional shape.

In any of the embodiments described herein, the plurality of compartments may be arranged in a staggered configuration In any of the embodiments described herein, the HSM may further include a roof on the body.

In any of the embodiments described herein, the roof may have impact resistance means, preferably including one or more of the following elements: an impact resistant polymer blanket; a reinforced concrete slab supported by pre-deformed steel pipes; half pipes; a pre-tensioned concrete slab.

In any of the embodiments described herein, the roof may be supported only by the front and back walls.

In any of the embodiments described herein, at least a first vertical pathway may extend from each inlet vents to each compartment and at least a second vertical pathway may extend from each compartment to each outlet vent.

In any of the embodiments described herein, the HSM may further include a carriage assembly for lifting the canister to the second elevation.

In any of the embodiments described herein, the body portion may be modularized and made from a plurality of segments.

In any of the embodiments described herein, the plurality of segments may be vertically layered on top of each other.

In any of the embodiments described herein, adjacent segments may be attached to one another using only a vertical attachment system.

In any of the embodiments described herein, the vertical attachment system may include a plurality of vertically oriented holes in the walls of adjacent segments, and ties connecting such holes.

In any of the embodiments described herein, the plurality of segments may be made from reinforced concrete.

In any of the embodiments described herein, a method of construction may further include vertically attaching adjacent segments.

In any of the embodiments described herein, the frame assembly may be folded to a traveling configuration and expanding to a lifting configuration.

In any of the embodiments described herein, the carriage assembly may further include a conveyance assembly configured for mating with a track.

In any of the embodiments described herein, the frame assembly may include a catcher assembly for coupling with a supporting skid to carry the cask.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of the features described herein.

Figure 1:
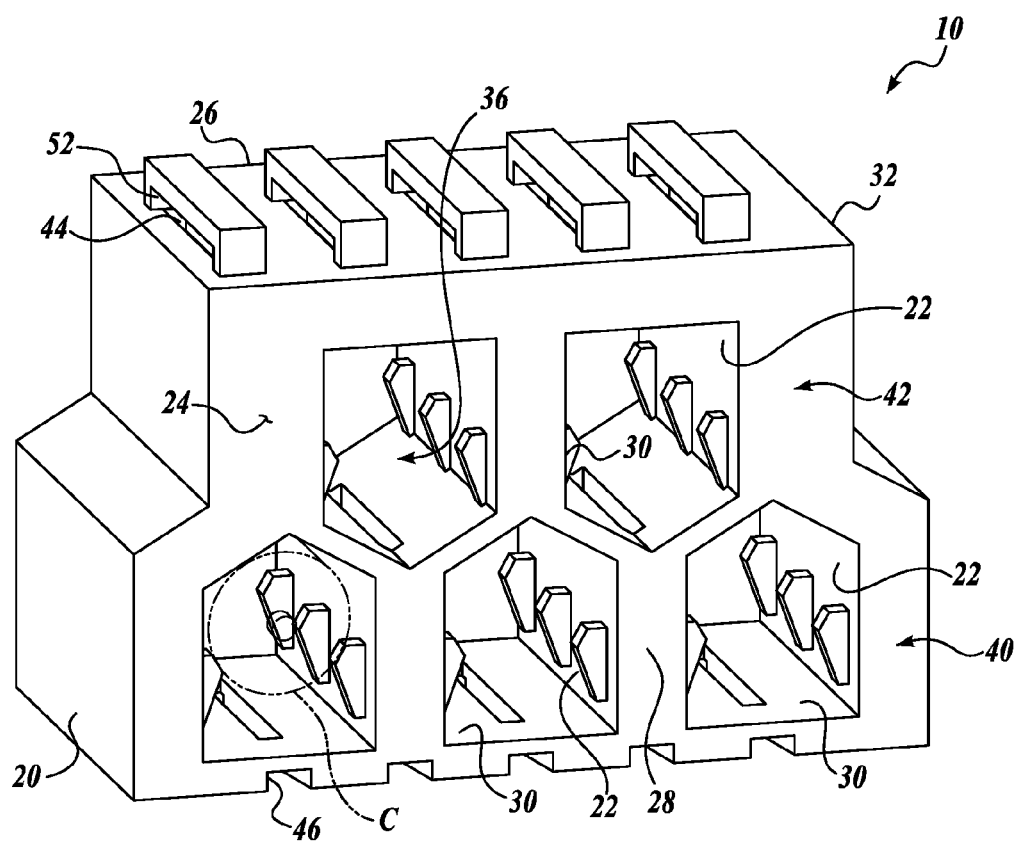
FIG. 1 is an isometric view of a high-density horizontal storage module (HSM) in accordance with one embodiment of the present disclosure.
Figure 2:
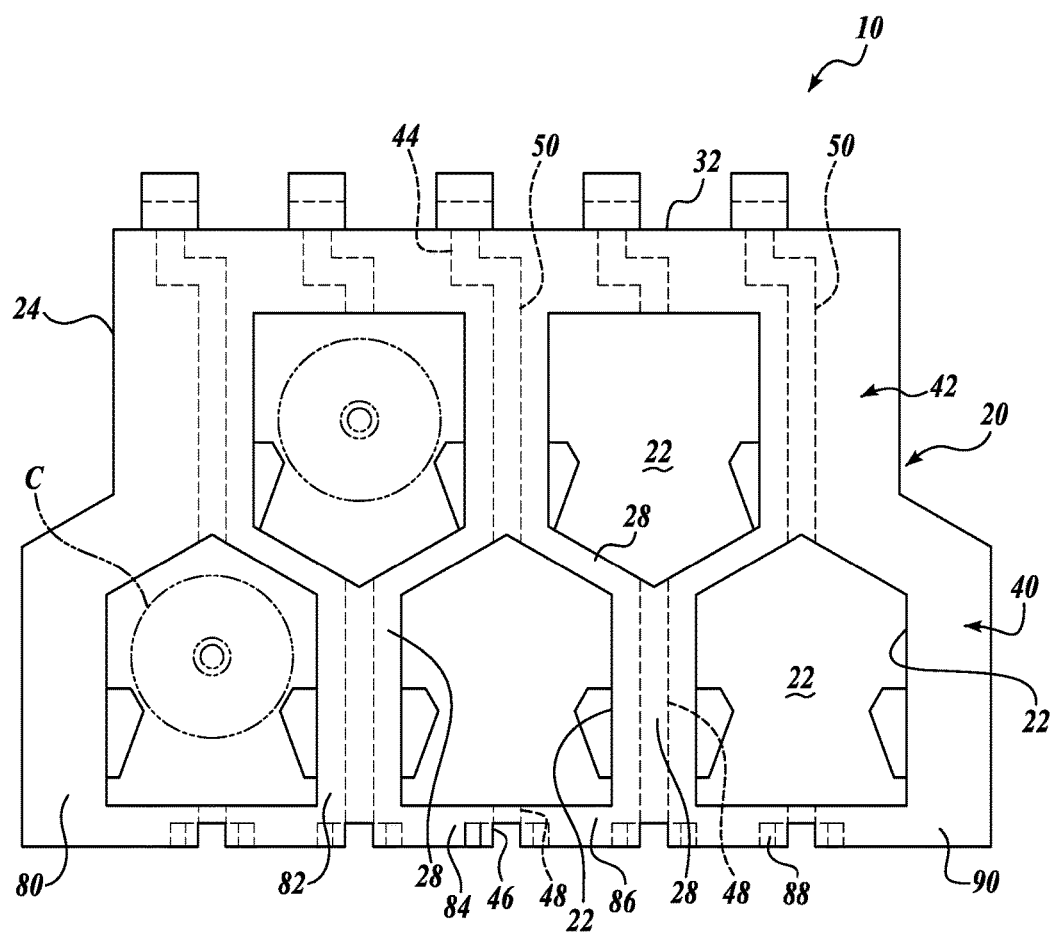
FIG. 2 is a cutaway front view of the high-density HSM of FIG. 1.

Embodiments of the present disclosure are directed to horizontal storage modules (HSMs), for example, used for the dry storage and containment of radioactive materials as ventilated canister storage systems having modular constructions, and methods of manufacturing the same. Methods of manufacturing may include manufacture, construction, and/or fabrication. Referring to FIGS. 1 and 2, a high density HSM assembly 10 constructed in accordance with one embodiment of the present disclosure is provided.

The HSM 10 in the illustrated embodiment of FIGS. 1 and 2 includes a body 20 defining a plurality of compartments 22 configured for receiving canisters C that may contain radioactive materials. The body 20 includes a front face 24, a rear wall 26, and a plurality of interior dividing walls 28 defining the plurality of compartments 22.

The HSM 10 includes a plurality of front entry holes 30 leading to each of the plurality of compartments 22 for supporting individual canisters C. Shielding doors (not shown) can be used to close the front entry holes 30 of the HSM 10 after the canisters C have been received. A roof or lid 32 can be constructed integrally with the dividing walls 28 or can be manufactured separately from the body 20 and placed on top of the body 20 when the HSM 10 is assembled on site for use, as described in greater detail below.

Figure 5:
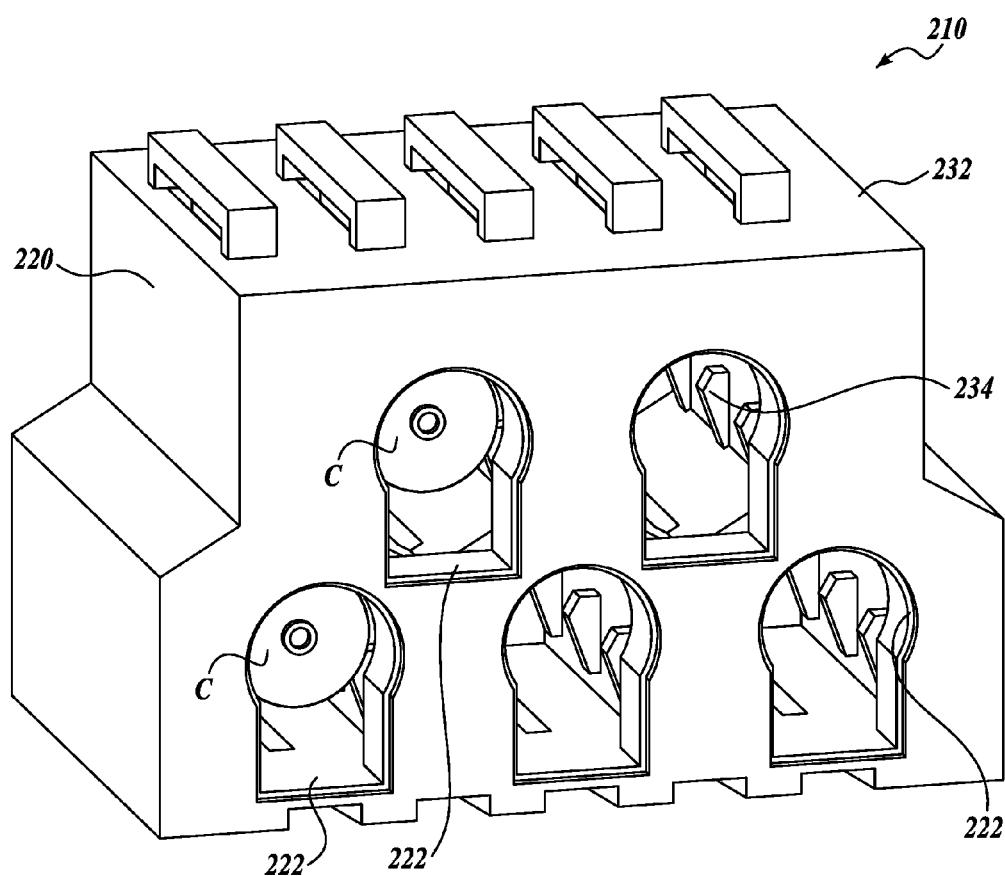
FIG. 5 is an isometric view of a high-density HSM in accordance with yet another embodiment of the present disclosure.

Inside the compartments 22, the canisters C may rest on suitable resting devices 34, such as pillow blocks, bearing blocks, or rails or any combination thereof (see pillow blocks 234 in FIG. 5). The canisters C can be inserted by being pushed into the entry holes 30, for example, along rails or bearing blocks, or by being set down on the support pillow blocks, as described in greater detail below. The sizing of the entry holes 30 along with the configuration and/or sizing or rails, pillow blocks, or bearing blocks can be used to accommodate canisters C having different diameters.

The HSM includes provisions in the front and back of the cavities for retaining the canister C in horizontal orientation (in case of a seismic event). In one embodiment, the canister C may be free to slide in the compartment cavity 36 to some degree. In one embodiment, the canister C may be anchored to the pillow blocks to prevent significant sliding.

In one embodiment of the present disclosure, each compartment 22 shares a common dividing wall 28 with at least one other compartment 22. In another embodiment, each compartment 22 shares a common dividing wall 28 with at least two other compartments 22.

In the illustrated embodiment of FIGS. 1 and 2, the HSM 10 includes five compartments 22 for receiving five separate canisters C. The five compartments 22 are arranged in a staggered configuration having a bottom row 40 and a top row 42. An exemplary staggered configuration is shown in the illustrated embodiment, such that the compartments are arranged in a first row at a first elevation and a second row at a second elevation higher than the first elevation, and wherein at least a portion of one compartment in the first row is in the same horizontal axis location as at least a portion of one compartment in the second row. In that regard, the compartment in the second row may not be directly positioned on top of the compartment in the first row. Instead, the compartments may be staggered and only have some overlap on point along a horizontal axis.

In one embodiment, each compartment 22 is adjacent to at least two other compartments 22. In another embodiment, adjacent compartments 22 may share a common dividing wall. The top compartments 22 are adjacent three other compartments 22. The bottom center compartment 22 is adjacent four other compartments 22.

In the illustrated embodiment, each compartment 22 is polygonal in cross-sectional shape. In other embodiments, the compartments 22 may have rounded walls instead of planar walls or a combination thereof (for example, a keyhole shape). In other embodiments, the compartments 22 may have a circular shape. In another embodiment, the structure may have a honeycomb configuration including a plurality of adjacent hexagonal cells. The front openings to the compartments 22 may be selected from various shapes, such as round, partial round mated with other shapes, and round with other openings in other locations to accommodate roller trays or other devices to be inserted into the HSM compartment 22.

In one non-limiting example, at least a portion of the compartments 22 may be hexagonal in cross-sectional shape. The compartment can also have other polygonal shapes such as triangular, rectangular, or pentagonal. In the illustrated embodiment of FIGS. 1 and 2, the compartments 22 in the bottom row 40 have a five-sided cross-sectional shape. The top row of compartments 22 have five sides, and are designed to interface with the five sided pattern of the bottom row.

Figure 4C:
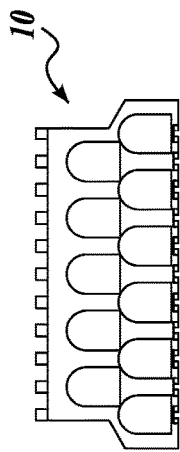
FIGS. 4A-4D show comparative front and top views of a previously designed HSM arrangement (FIGS. 4A and 4B) and another arrangement in accordance with embodiments of the present disclosure (FIGS. 4C and 4D)
Figure 4D:
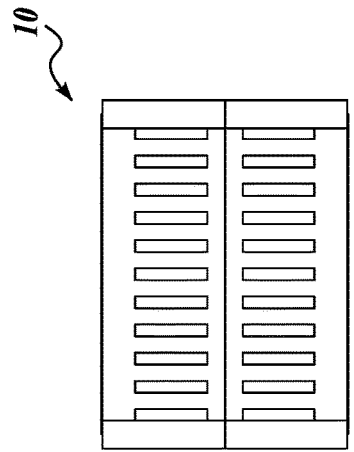

Although illustrated as including five compartments arranged in a honeycomb configuration, other staggered configurations and arrangements are within the scope of the present disclosure. As non-limiting examples, the number of compartments, arrangement of compartments, number of rows, and/or cross-sectional shapes of the compartments may vary. As one example, the embodiment in FIGS. 4C and 4D is a staggered HSM having eleven compartments. As another example, an HSM may include compartments having non-hexagonal cross-sectional shapes that share a common dividing wall with at least one other compartment. In FIG. 5, the HSM 210 includes key-hole shaped compartments 222. In another embodiment, an HSM may include three or more rows of compartments.

HSMs in accordance with embodiments of the present disclosure may be manufactured from reinforced concrete. For example, shielding walls can be made with steel fiber concrete. Other types of concrete such as reinforced with rebar, heavy duty, steel or other type of fibers.

Figure 4A:
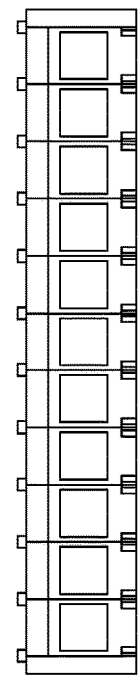
Figure 4B:
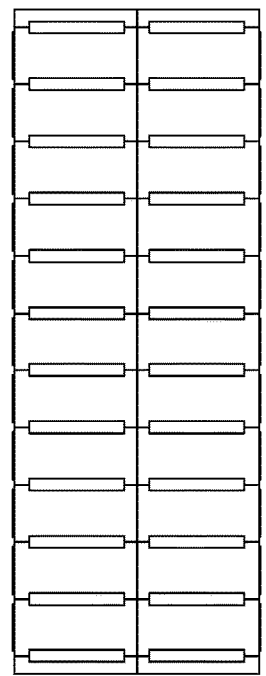

Previously designed HSMs include enhanced radioactive shielding performance, seismic capabilities, heat rejection capabilities, and ruggedness for resisting acts of sabotage. Moreover, previously designed HSMs are fabricated off-site (or near site) so as to not require any major construction at the containment site. Embodiments of the present disclosure are also designed to meet these criteria HSMs in accordance with the present disclosure are designed to have a reduced HSM footprint per canister as compared to previously designed HSMs to increase the storage capacity of a particular storage array. Referring to FIGS. 4A and 4B, a previously designed HSM arrays is shown, including the HSM-H 2×11. Comparatively, a Staggered HSM 2×11 array in accordance with one embodiment of the present disclosure has a significantly reduced footprint area (see FIGS. 4C and 4D). In this example, the reduced Staggered HSM footprint is approximately 50% of the previously HSM-H arrays.

Figure 3B:
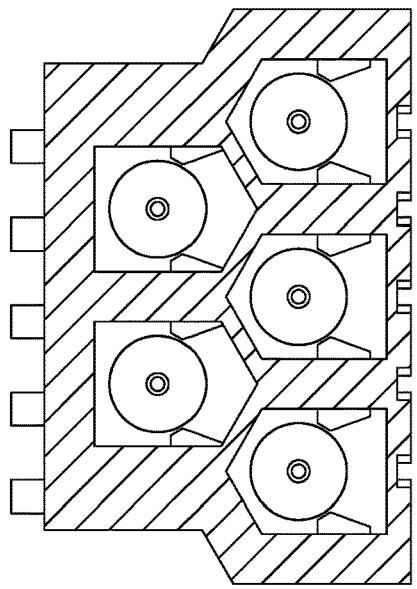
FIGS. 3A and 3B show comparative front views of two systems: a previously designed HSM arrangement (FIG. 3A) and the high-density HSM of FIG. 1 (FIG. 3B)
Figure 3A:
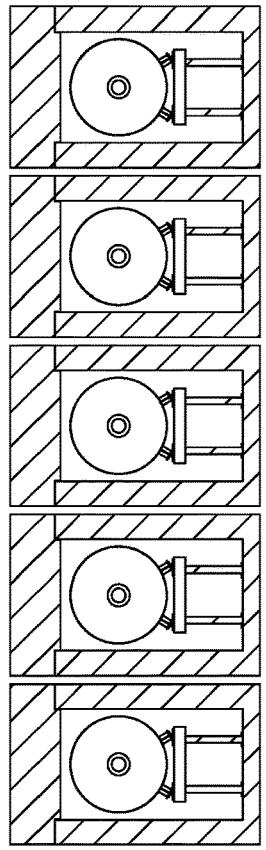

A side-by-side comparison of an HSM Model 102 array and a Staggered HSM array is shown in FIGS. 3A and 3B.

The height of an HSM designed in accordance with embodiment of the present disclosure may be higher than the previously designed HSMs (see FIGS. 3A and 3B), for example, a height increase of about 20 inches to about 40 inches (about 50 to about 100 cm). Despite the height increase, the staggered array of the high density HSM 10 allows for a reduction in reinforced concrete for HSM construction in the range of about 30 to 45%.

The HSM is supported by a concrete pad that must meet requirements set forth by the Nuclear Regulatory Commission (NRC) or any other nuclear spent fuel management regulatory authority. The HSM reduced footprint also allows for a reduction in the costs and complexities associated with the concrete pad based on reduced requirements for concrete pad length, concrete hardness, soil stiffness, and other soil conditions. The HSM may be anchored to the pad or free to slide.

As can be seen in FIG. 4D, the HSMs 10 of the present disclosure may be arranged back-to-back in an array to maximize the use of space.

Referring to FIGS. 1 and 2, the HSM 10 includes a roof or lid 32 including a plurality of outlet vents 44 located above the compartments 22. Inlet vents 46 are located at the bottom of the HSM 10 under the compartments 22. To reduce the radiation dose from the inlet and outlet vents, theses vents may be included with dose reduction hardware such as pipes, plates, or any other suitable hardware. In addition or alternatively, dog leg inlet and/or outlet vents can be used to reduce dose. Outlet vent covers can also be used to reduce dose.

In the illustrated embodiment, each compartment 22 has its own substantially vertical airflow pathway. At least a first pathway 48 extends from each inlet vents 46 to each compartment 22 and at least a second pathway 50 extends from each compartment 22 to each outlet vent 44. As system including a bottom location for the inlet vents 46 and a top location for the outlet vents 44 is advantageous because it is unlikely there would be blockage of both the inlet vents 46 and the outlet vents 44 in a flood event depending on the flood water height.

In another embodiment, a top vent from a compartment 22 in the bottom row 40 may vent into another compartment 22 in the top row 42 before venting to ambient air.

The increase in height of the HSM 10 of the present disclosure, as compared to previously designed HSMs, compensates for heat removal from the bottom row 40 of compartments 22. In addition, the cavity 36 sizing for the compartments 22 may include spacing for heat shields between the compartment 22 interior surface and the canister C outer surface.

In addition, the HSM 10 may include additional vents in the back or side walls of the body 20 (see e.g., side lid vent 52 in FIG. 1). Therefore, the HSM 10 may include more than one inlet vent and more than one outlet vent per module.

Figure 6:
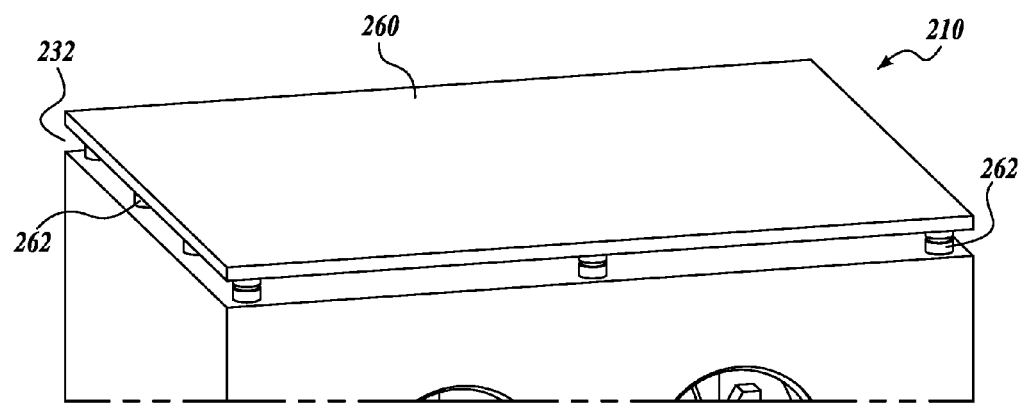
FIGS. 6-8 are isometric views of various roof designs for high-density HSMs in accordance with embodiments of the present disclosure.
Figure 7:
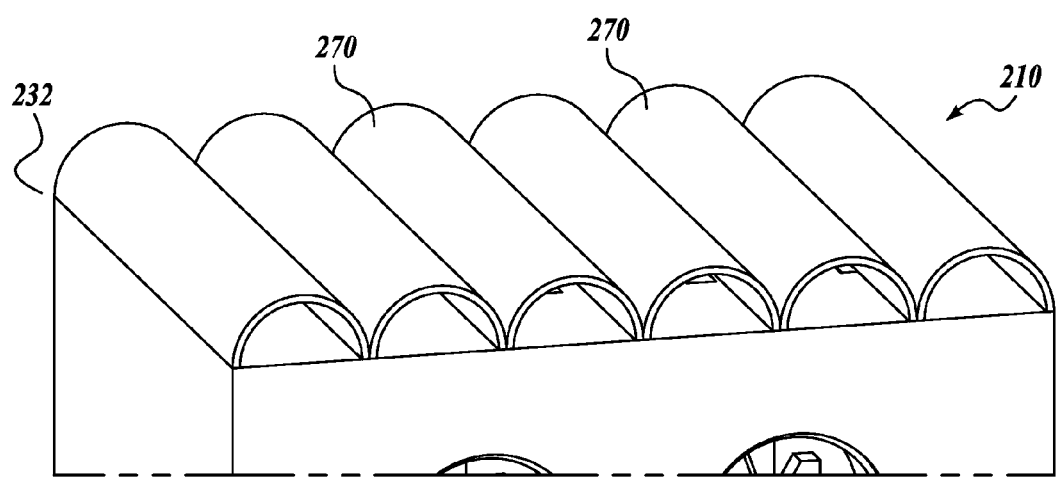
Figure 8:
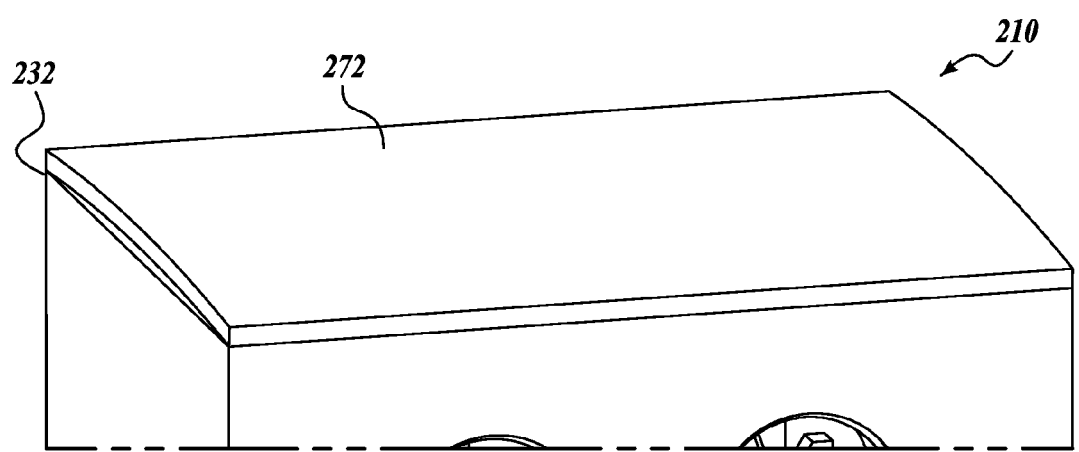

In addition to a common lid 32, the HSM 10 may further include an enhanced roof design for increased resistance for missile and aircraft crash or any other impact or explosion loads. In the illustrated embodiments of FIGS. 6-8, alternative roof designs are provided. These exemplary roof designs provide an impact spreader and may be used individually or together in combination with one another, and may be applied to roof and walls. In FIG. 6, the HSM 210 includes a reinforced concrete slab 260 and pre-deformed steel pipes 262 on top of roof 232. In FIG. 7, the HSM 210 includes a series of adjacent half pipes 270 on roof 232. In FIG. 8, the HSM 210 includes a pre-tensioned concrete slab 272 on roof 232.

In some embodiments, the roof 232 may be lined with an impact resistant polymer blanket for missile protection and/or heavily reinforced to be resistant to aircraft crash. In one embodiment of the present disclosure, the roof 232 is supported fully on front and rear walls 24 and 26 of the HSM 10, without significant load being transmitted to interior dividing walls 28.

Advantageous effects of a staggered, high density HSM 10 include the following. The HSM 10 includes additional self-shielding as compared to previously designed HSMs, due at least in part to the monolith structure with no gaps. Further, the high-density HSM 10 has a reduction of about 50% of the skyshine and direct dose from the HSM array roof because there is no roof for the bottom row 40 of compartments 22. In addition, there is a significant reduction in the skyshine dose from the bottom HSM roof vents because of the long chimneys for those vents. The dose reduction hardware at the HSM bottom arrays reduces inlet vent dose rates.

Other advantageous effects of the HSM 10 according to the illustrated embodiment having at least some of the compartments 22 with a hexagonal cross-sectional shape include improved efficiency in the use of space and material, increased concrete surface area surrounding individual canisters for heat transfer, as compared to a rectangular array, and better weight distribution in a staggered structure, resulting in improved structural strength. In addition, adjacent modules self-shield each other similar to a rectangular array, with no indication of a compromise in the shielding effectiveness as compared to a rectangular array. Moreover, the hexagonal cross-sectional shape is a particularly efficient shape for compressive strength and tensile strength.

In addition to impact loads resistance due to explosives, missile or aircraft, the HSMs of the present disclosure are further designed for increased resistance to seismic events. The monolith array provides high seismic resistance. Increasing the size of the monolith array and the number of compartments can provide stronger seismic performance and a lower center of gravity. The monolith array may be free to slide on the pad with no need for a high seismic pad design. In addition, the compartments and vent flow paths are visible and easy to inspect for integrity after a seismic or other type of event, such as flood or tsunami The HSMs 10 of the present disclosure may be manufactured as modular to simplify manufacture and shipment or cast in place monolithically, as described in greater detail below.

Figure 9:
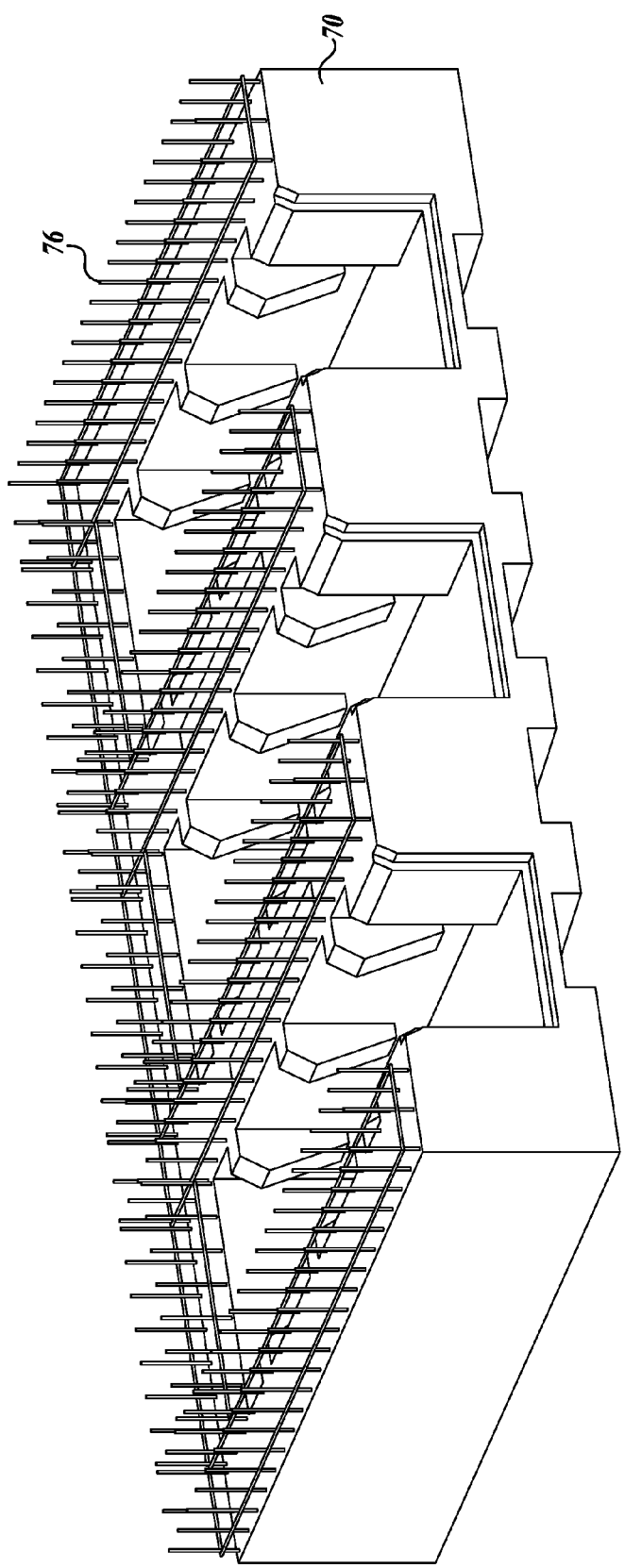
FIGS. 9 to 11 are isometric views illustrating one method of manufacture of a high-density HSM in accordance with one embodiment of the present disclosure.
Figure 10:
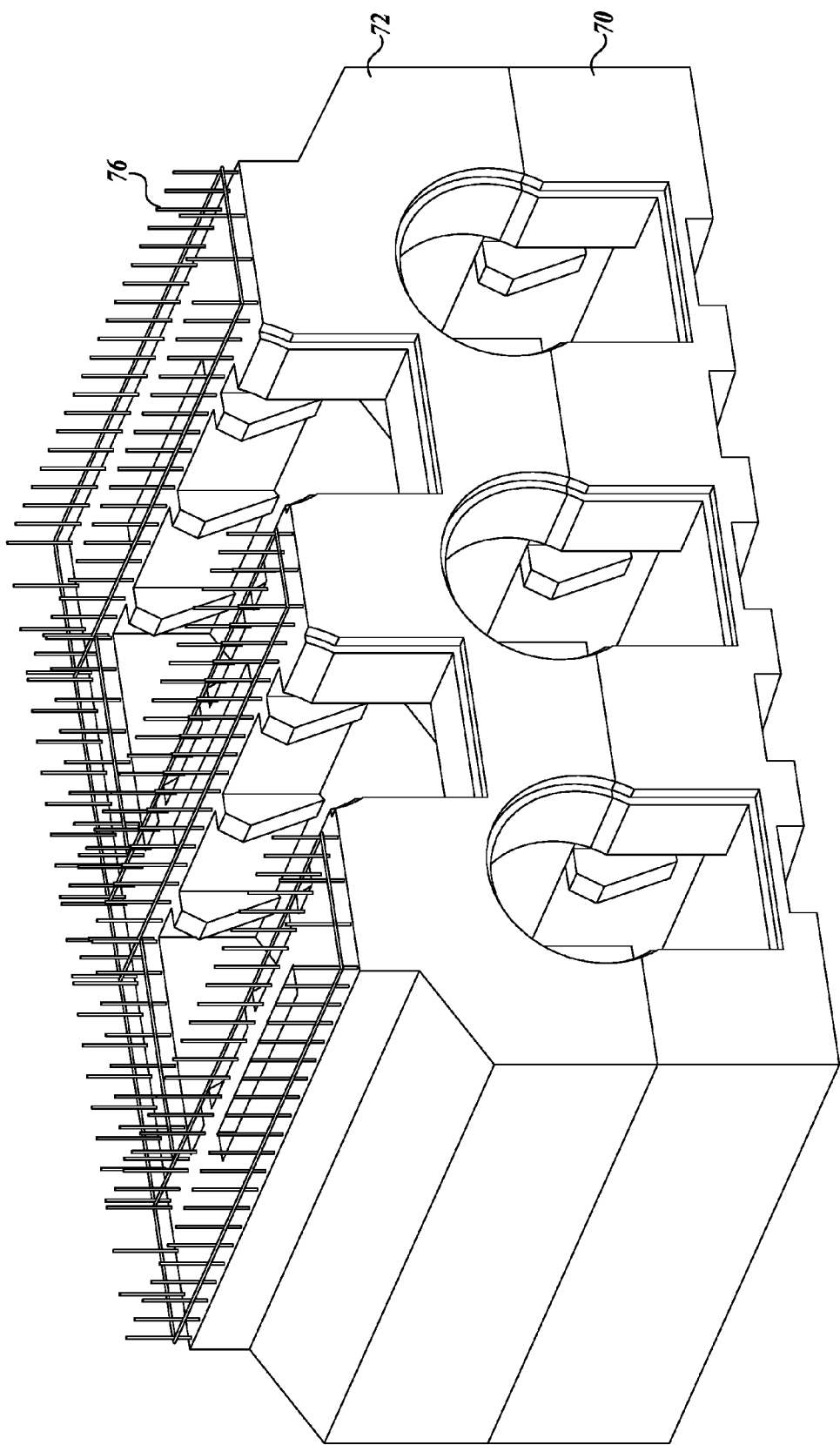
Figure 11:
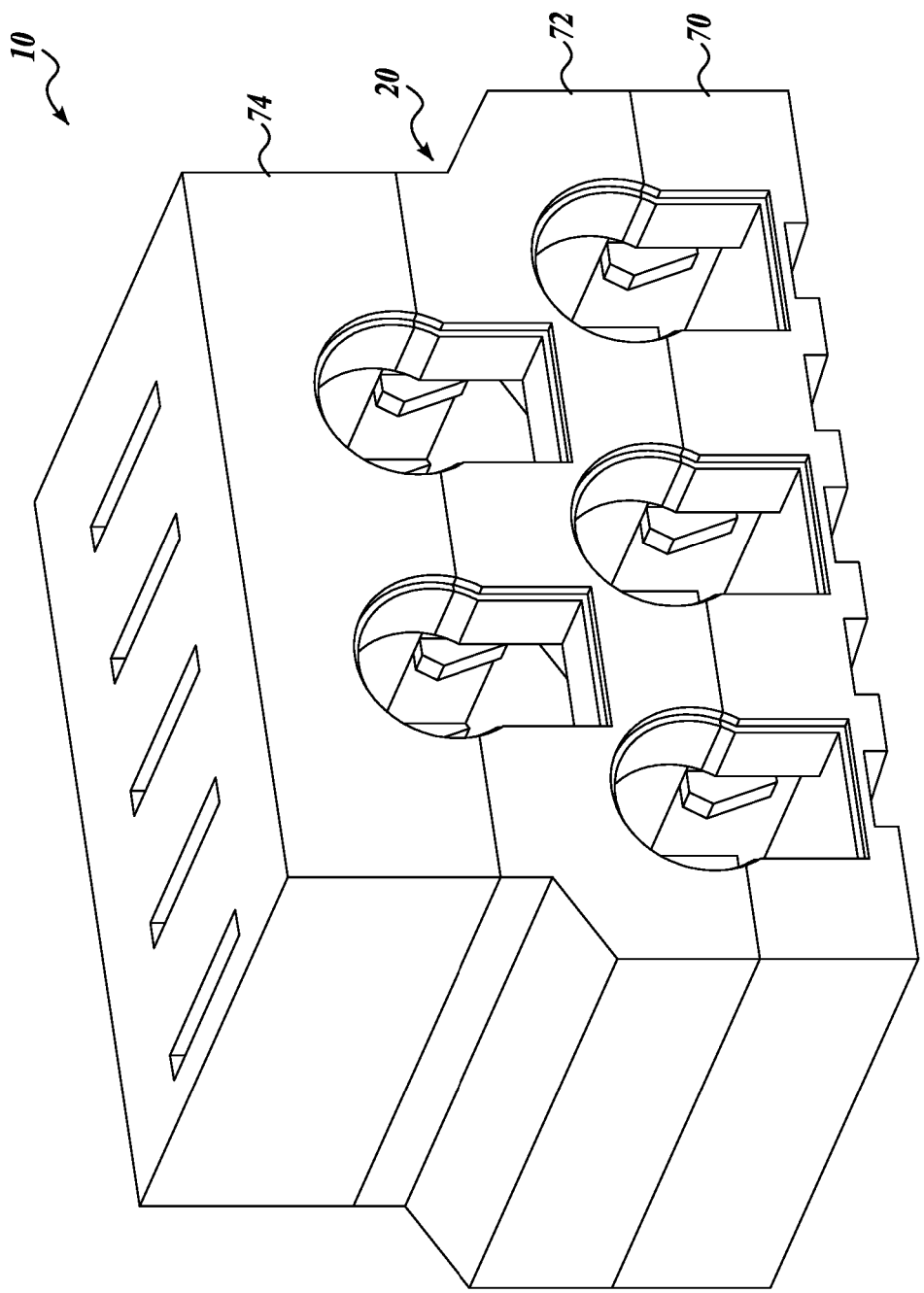

Referring to FIGS. 9-11, a monolithic casting method for an HSM 10 will now be described. The HSM assembly 10 includes a body portion 20 having a plurality of segments or layers 70, 72, 74 (see FIG. 11) that can be constructed on top of one another.

Such casting layers employ a construction joint technique, as is described in greater detail below. In the illustrated embodiment, the body portion 20 is divided into three layers; however, any number of body portion layers is within the scope of the present disclosure.

In the illustrated embodiment of FIG. 11, the three layers 70, 72, and 74 of the body portion 20 have construction joints between layers in horizontal planes occurring through the compartments 22. In one embodiment of the present disclosure, the segments 70, 72, and 74 are substantially similar in at least one of size, shape, and weight. The term "substantially" is used herein to be within an acceptable range of engineering tolerance in the industry. In other horizontal layering within the scope of the present disclosure, the segments 70, 72, and 74 are not substantially similar in at least one of size, shape, and weight.

In accordance with one embodiment of the present disclosure, a method of manufacturing the layered body portion 20 will now be described. The modular layer HSM assembly 10 may be constructed using reinforced concrete (or other types of concrete) that is poured in a metal and/or wood forms (as illustrated in FIG. 9). The first layer 70 of the body portion 20 is poured into the forms, and allowed to harden. Thereafter, the second layer 72 of the body portion 20 is formed and poured into the forms on top of the hardened first layer 70 (as illustrated in FIG. 10). Subsequently, the third layer 74 is poured into the forms on top of the hardened second layer 72 (as illustrated in FIG. 11). The roof or lid 32 may be formed separately, or may be formed on top of or as part of the hardened third layer 74.

By casting subsequent layers against a hardened previous layer, the joints are almost invisible.

Because of casting in multiple layers 70, 72, and 74, the hydrostatic pressure in each layer is substantially decreased in a linear relation to the layer height, as compared to a single body unit HSM. As the hydrostatic pressure is reduced, the potential for dimensional deviation in the layer 70, 72, and 74 is significantly reduced. As a non-limiting example, for a three-layer concept, the hydrostatic pressure in each layer may be decreased in a linear relation to layer height to be approximately ⅓ of the hydrostatic pressure in a comparable single body unit HSM. Likewise, for a two-layer concept, the hydrostatic pressure in each layer may be decreased to be approximately ½ of the hydrostatic pressure in a comparable single body unit HSM.

Moreover, the forms for manufacturing the modular layer HSM assembly 10 are less expensive and more reliable because they are not required to be stiffened for handling the height requirements of a comparable single body unit HSM.

Although described as using a single form, it should be appreciated that the use of multiple forms for the various different segments of the body portion 20 is also within the scope of the present disclosure.

A suitable vertical attachment system may include using ties 76, such as rebar ties or rebar splicing technique. Vertical rebar is left exposed during forming and placement of layer 70. The rebar is then spliced and tied to rebar of layer 72. Similarly, vertical rebar is extended from layer 72 into layer 74 and spliced with matching rebar in layer 74. Other vertical attachment systems are also within the scope of the present disclosure.

Returning now to FIG. 2, another method of manufacturing the segmented body portion 20 using a horizontal segment attachment method will now be described. The modular layer HSM assembly 10 may be constructed using reinforced concrete that is poured in a single form. The segments 80, 82, 84, 86, 88, and 90 are divided along the vent path lines. The lid 32 may be formed separately, or may be formed on top of the complete hardened body portion 20. A horizontal attachment system, such as a post tension system or any other suitable attachment system, may be used to attach the segments 80, 82, 84, 86, 88, and 90. A similar manufacturing method may be used for forming other vertical segments.

Carriage Assembly

Referring now to FIGS. 12-18, a carriage assembly 120 and method for lifting a canister C for transfer from a cask K into an entry hole 30 in the top row 42 of an HSM 10 will now be described. The carriage assembly 120 includes a frame assembly 122 having first and second frame portions 124 and 126 for receiving a cask K containing a canister C. The first and second frame portions 124 and 126 are connected to one another by a joinder arm 128 (which is shown in a folded position in FIG. 12 and an extended position in FIG. 13).

Figure 12:
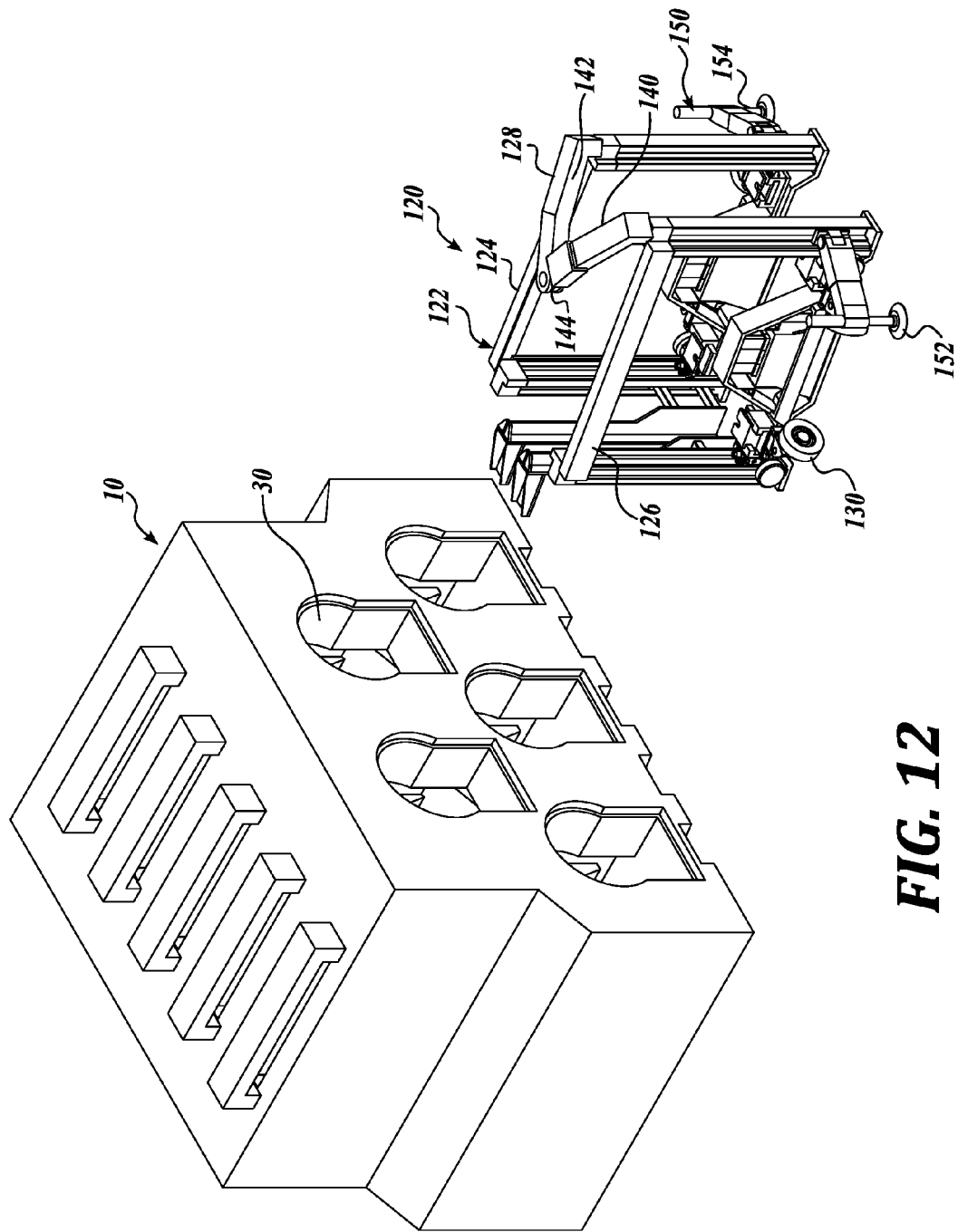
FIGS. 12-18 are isometric views showing a carriage assembly and the sequence steps of lifting a canister for loading into the top row of compartments of a high density HSM in accordance with one embodiment of the present disclosure.
Figure 13:
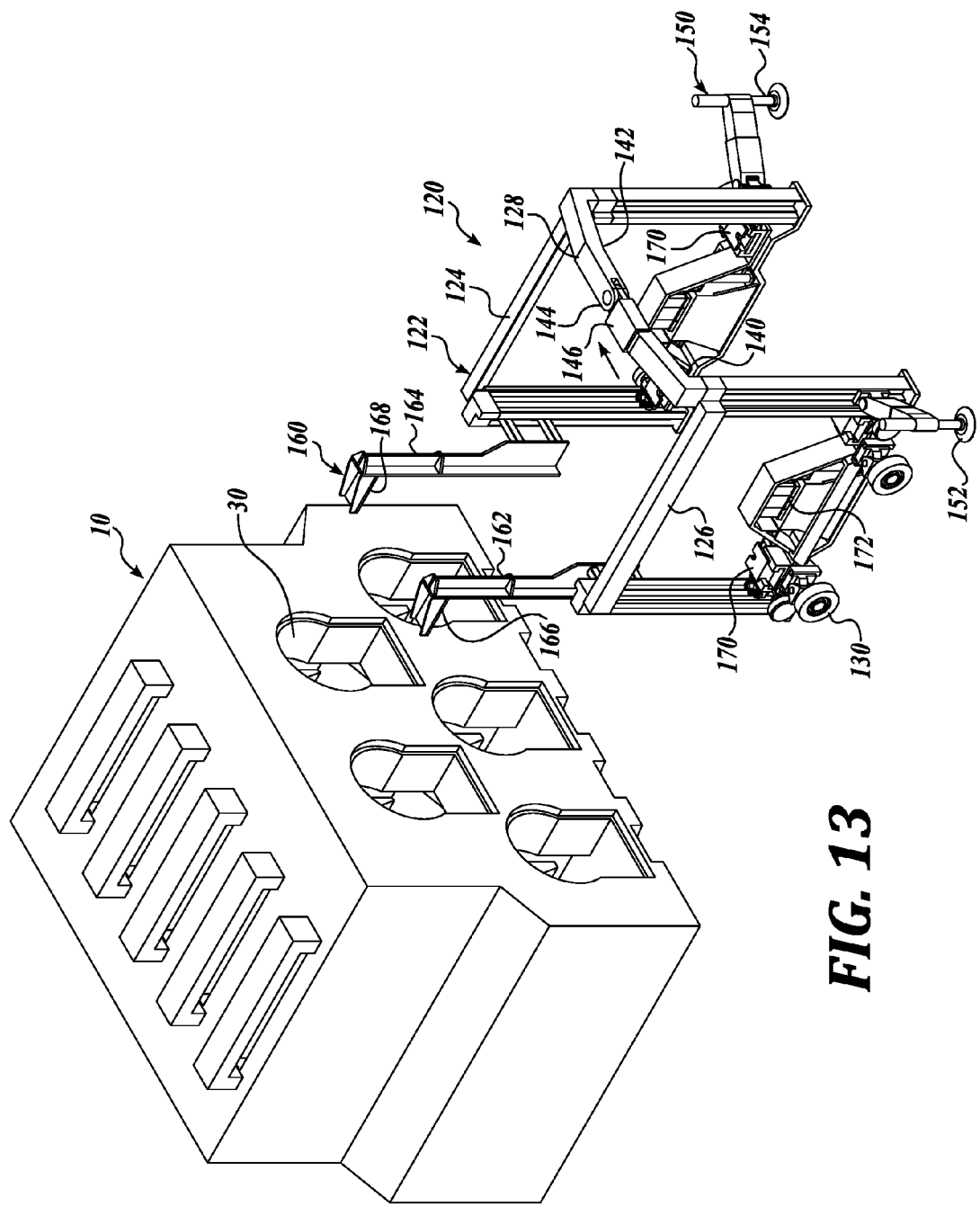

The carriage assembly 120 is supported by a means for conveyance, shown as a plurality of wheels 130, such that the carriage assembly 120 can be positioned at numerous positions along the HSM 10 or in the storage facility. Referring to FIGS. 12 and 13, the wheels 130 may pivot relative to the frame assembly 122 to allow for multi-directional travel.

The means for conveyance may also include other suitable types of conveyances besides wheels, such as tracks, rollers, bearing pads, bearing surfaces, air skids, and combinations thereof. In the illustrated embodiment, the wheels 130 are configured for sideways travel for positioning the carriage assembly 120 at the HSM 10 and also for foldability and expansion (compare configuration of carriage assembly 120 in FIGS. 12 and 13).

As can be seen in comparing FIGS. 12 and 13, the carriage assembly 120 may be foldable for compact storage and movement in the storage facility. Upon arrival at a position for lifting, the carriage assembly 120 can be expanded to its lifting configuration (see FIG. 13). As seen in FIG. 13, width expansion is achieved by moving the first and second frame portions 124 and 126 outwardly away from each other. Joinder arm 128 includes first and second arms portions 140 and 142 and an elbow coupling 144. The arm portions 140 and 142 rotate relative to the first and second frame portions 124 and 126 and the elbow coupling 144 for arm extension. When the joinder arm 128 is extended, the first and second frame portions 124 and 126 are distanced from each other an appropriate distance to receive a cask K for lifting (see FIG. 15). Comparing FIGS. 13 and 14, when the elbow coupling 144 is in its fully extended position, a locking portion 146 can be moved to a locking position to cover the elbow coupling 144 and prevent it from bending during use. Other locking configurations for the joinder arm 128 are also within the scope of the present disclosure.

Figure 14:
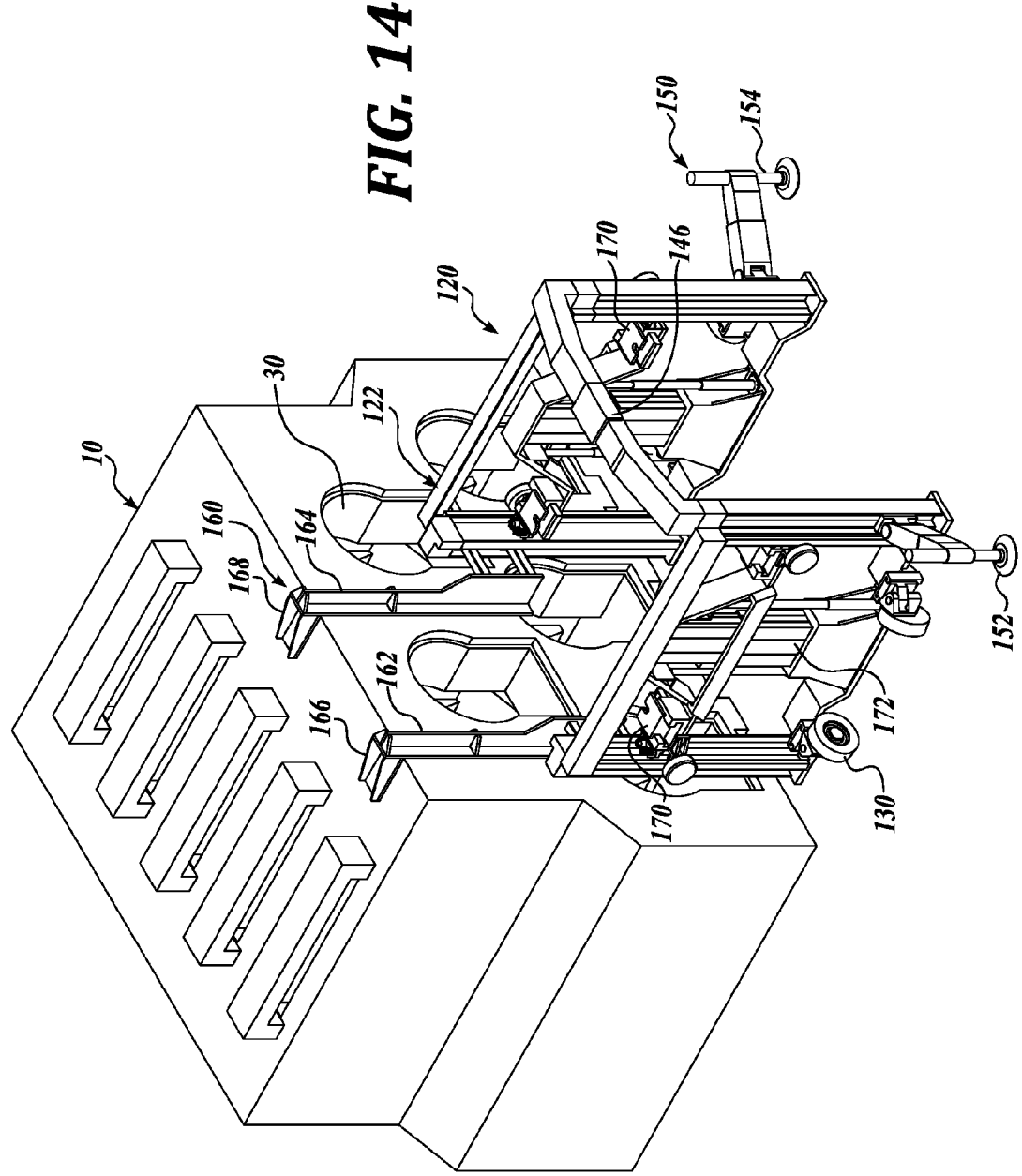

As seen in FIG. 14, the carriage assembly 120 has been expanded to its receiving and lifting configuration and moved to couple with the HSM 10. The carriage assembly 120 includes a stabilization system for stabilizing the carriage assembly 120 and/or securing the carriage assembly 120 to the HSM 10 to prevent movement during a seismic event that may occur during the transfer process. The stabilization system includes a ground anchor or outrigger system 150 shown as first and second anchors 152 and 154 deployed from a first unengaged position (see FIG. 12) to a second engaged position (see FIG. 14) are used to stabilize the carriage assembly 120 when it is received in a transfer position. Any suitable number of anchors or outriggers in the ground anchor system (such as one or more than two) is within the scope of the present disclosure.

The stabilization system further includes an HSM anchor system 160. In the illustrated embodiment, the HSM anchor system 160 includes first and second vertical arms 162 and 164 configured to engage with the front surface of the HSM 10. The arms 162 and 164 are respectively attached to the front of the first and second frame portions 124 and 126. Each of the arms 162 and 164 includes a respective extension portion 166 and 168 for engaging with the top horizontal surface of the HSM 10. As the carriage assembly 120 travels toward and approaches the HSM 10, the arms 162 and 164 are lifted upwardly relative to the frame assembly 122 with the extension portions 166 and 168 positioned above the top surface of the HSM 10 (see FIG. 13). When the carriage assembly 120 is secured in its transfer position, the arms 162 and 164 are retracted downwardly relative to the frame assembly 122 to engage the arms 162 and 164 with the front substantially vertical surface of the HSM 10 and to engage the extension portions 166 and 168 with the top substantially horizontal surface of the HSM 10 (see FIG. 14).

At the same time, the ground anchor or outrigger system 150 may be deployed such that the means for conveyance is inactivated. As seen in FIG. 14, with the ground anchor system 150 deployed wheels 130 are raised off the ground and free to pivot relative to the frame assembly 122.

Figure 15:
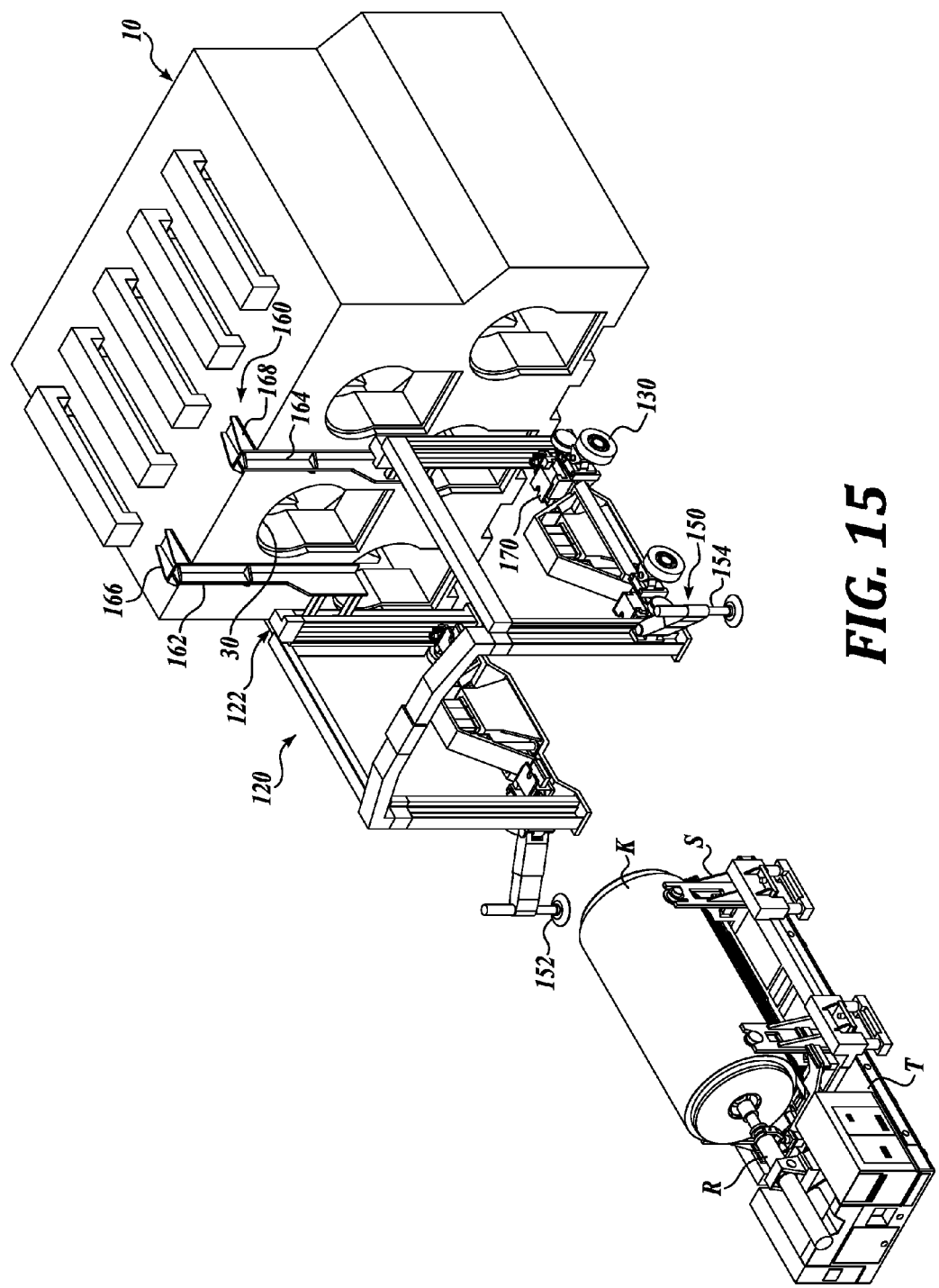

Referring now to FIG. 15, a trailer T including a skid S holding a cask K containing a canister C approaches the carriage assembly 120. The trailer T supporting the skid S and cask K rolls toward the HSM 10 and is received between the first and second frame portions 124 and 126 of the carriage assembly 120.

Figure 16:
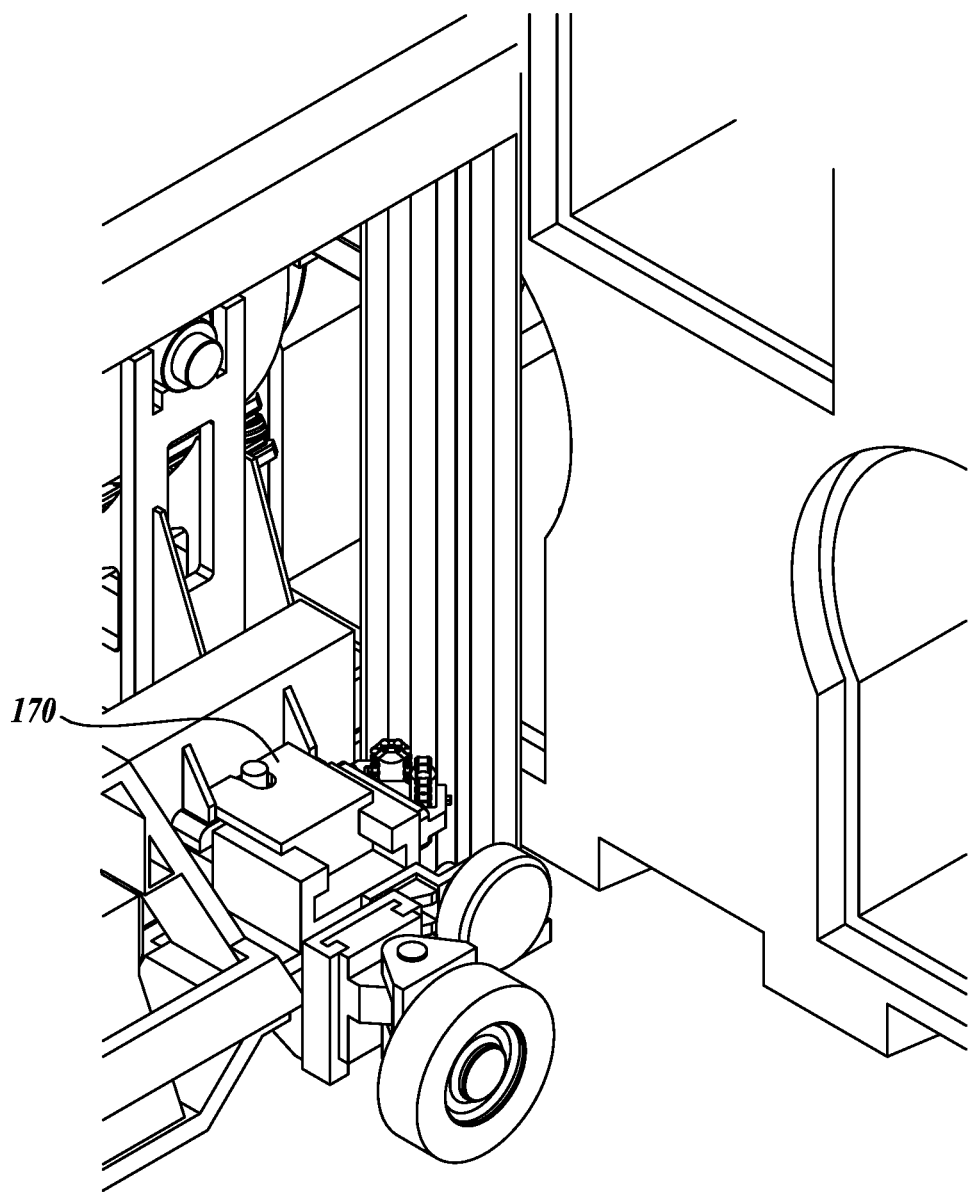

Referring to FIG. 16, gripping devices 170 from the carriage assembly 120 engage with the skid S to secure the skid S within the carriage assembly 120 and prevent movement during lifting.

Figure 17:
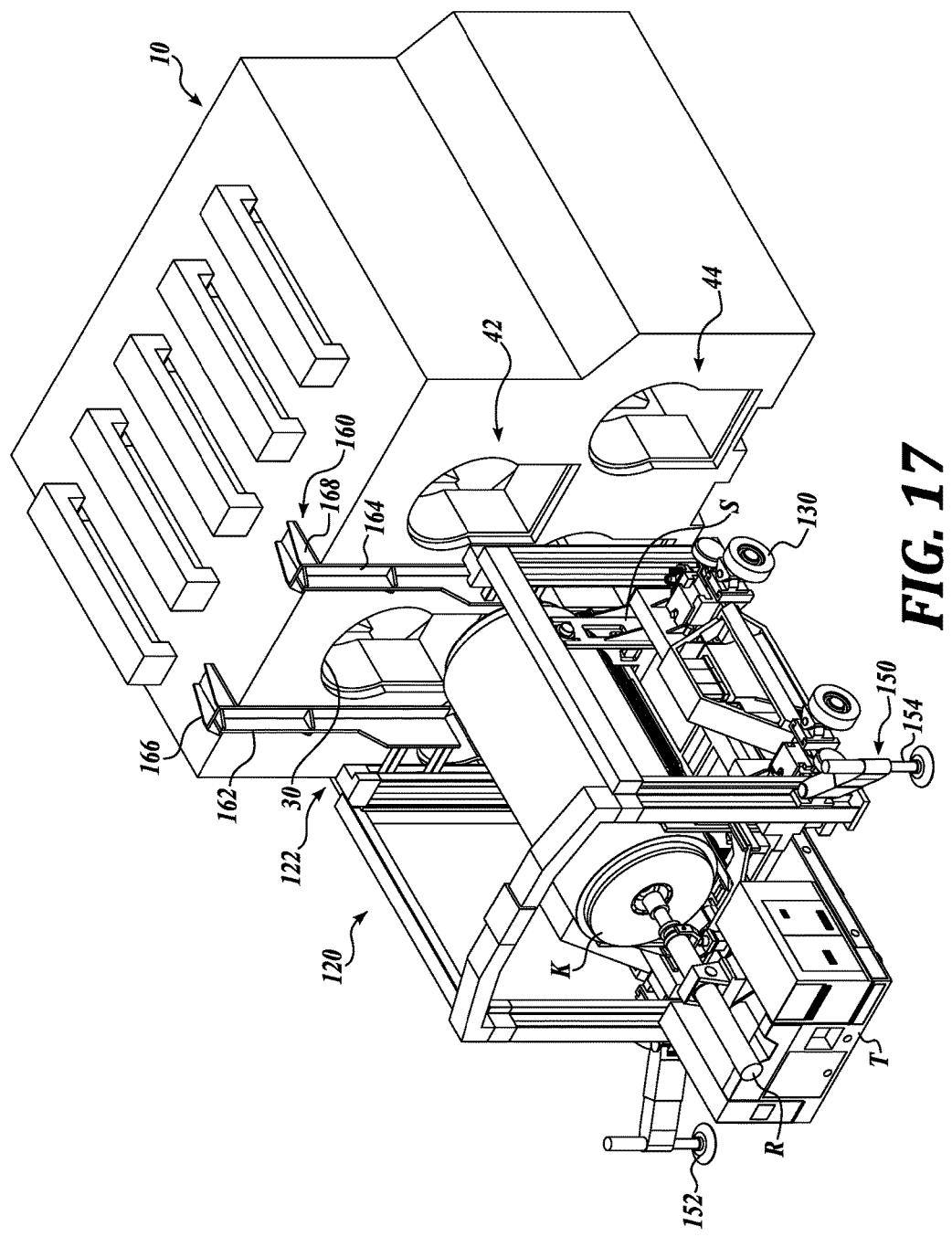
Figure 18:
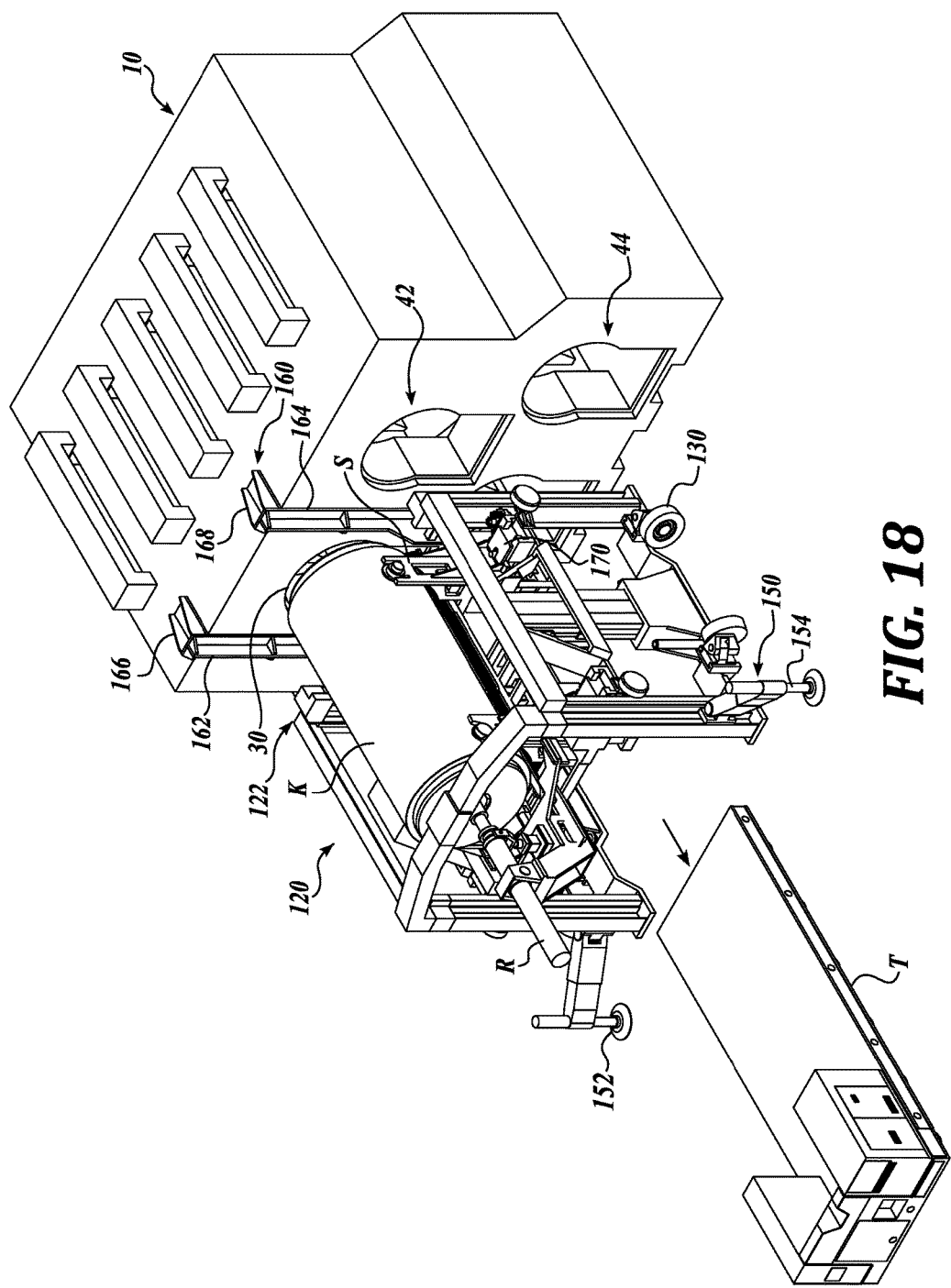

Referring to FIGS. 17 and 18, lifting features of the carriage assembly 120 will now be described. The carriage assembly 120 includes a plurality of lifting actuators or impact limiters 172 for use in moving the skid S and cask K from a first elevation position (see FIG. 17) to a second elevation position (see FIG. 18). The lifting mechanism for moving the skid S and cask K from a first elevation position to a second elevation position includes multiple fail safe mechanisms which may include shock absorbers, impact limiters, rack and pinion ratchet and friction brake, hydraulic load holding and safety circuitry. Other lifting systems are also within the scope of the present disclosure.

Comparing FIGS. 17 and 18, the carriage assembly 120 lifts the skid S holding a cask K containing a canister C from a first ground level elevation position to a second elevation position. In the second elevation position, a canister C is transferred from a cask K into an entry hole 30 in the top row 42 of an HSM 10. When the skid S and cask K are in the second elevation position, a linear actuator, shown as a telescoping ram device R extends and pushes the canister C out of the cask K and into the entry hole 30 in the top row 42 of an HSM 10.

Although shown and illustrated in a loading sequence for loading a canister C into an entry hole 30 in the top row 42 of an HSM 10, the carriage assembly 120 can also be used in an unloading sequence for removing a canister C from an entry hole 30 in the top row 42 of an HSM 10. In that regard, the telescoping ram device R may also be used to retrieve the canister from the cavity 36 in the top row 42 of the HSM 10 and pull it into the cask K. After being retrieved, the carriage assembly 120 lowers the skid S holding a cask K containing a canister C from the second elevation position to the first ground level elevation position.

As an alternative to sliding rails in the HSM 10 for sliding transfer of the canister to and from the compartment 22 of the HSM 10, a reduced-friction horizontal transfer device 220 described below may be used to transfer the canister C to and from the compartment 30 of the HSM 10.

Although shown as lifting to a second elevation position, embodiments of the present disclosure may also be configured to lift to higher elevation positions, for example, in HSMs 10 having more than two rows of compartments.

Referring now to FIGS. 19-25, a carriage assembly 320 and method for carrying and/or lifting a canister C for transfer from a cask K into entry holes 30 in both top and bottom rows of an HSM 10 in accordance with another embodiment of the present disclosure will now be described. The carriage assembly 320 of FIGS. 19-25 is substantially similar to the carriage assembly 120 of FIGS. 12-18, except for differences such as conveyance of the carriage assembly on tracks, securement of the skid to the carriage assembly, and lifting of the skid. Like numerals for the embodiment of FIGS. 19-25 are used for like parts as in the embodiment of FIGS. 12-18, expect in the 300 number series.

The carriage assembly 320 includes a frame assembly 322 having first and second frame portions 324 and 326 for receiving a cask K containing a canister C. The first and second frame portions 324 and 326 are connected to one or more joinders 328 (shown as two joinders in the illustrated embodiment). The joinders 328 of the illustrated embodiment are curved so as to accommodate a cask k and skid S when it is in an upper position (see, e.g., positioning of the cask k and skid S in FIG. 23). The carriage assembly 320 is shown in an extended position in FIG. 19, but like the carriage assembly 120 of the previously described embodiment of FIGS. 12-18, may be retractable into a retracted position (e.g., see FIG. 12).

The carriage assembly 320 is supported by a conveyance assembly, shown as a plurality of wheels 330, such that the carriage assembly 320 can be positioned at numerous positions along the HSM 10 or in the storage facility. The wheels 330 may pivot relative to the frame assembly 322 to allow for multi-directional travel. The wheels 330 may also be configured to align with one or more tracks 332, as seen in FIGS. 20-23. The tracks 332 extend the length of the installed HSMs 10 to provide directional and positional accuracy for the carriage assembly 320. The spacing of the tracks 332 and bi-directional symmetry of the carriage assembly 320 allow for use in a double array of HSMs 10 (see FIG. 20) or a single array of HSMs 10 (see FIG. 22).

Figure 21:
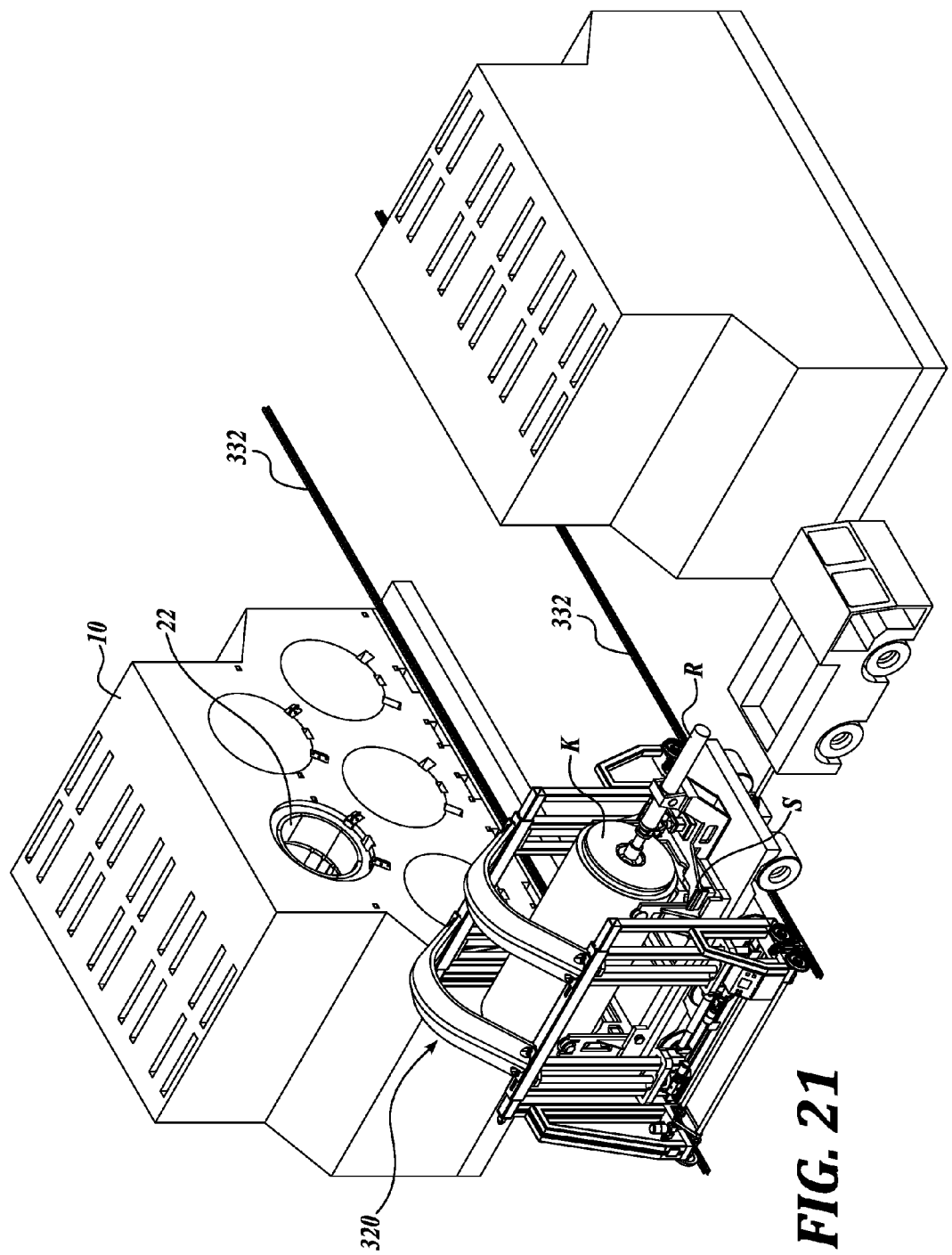

Referring to FIGS. 20-23, a method for loading a canister C into an HSM 10 will now be described. Referring now to FIG. 21, a trailer T including a skid S holding a cask K containing a canister C approaches the carriage assembly 320 positioned on tracks 332. The trailer T supporting the skid S and cask K is received between the first and second frame portions 324 and 326 of the carriage assembly 320.

Figure 19:
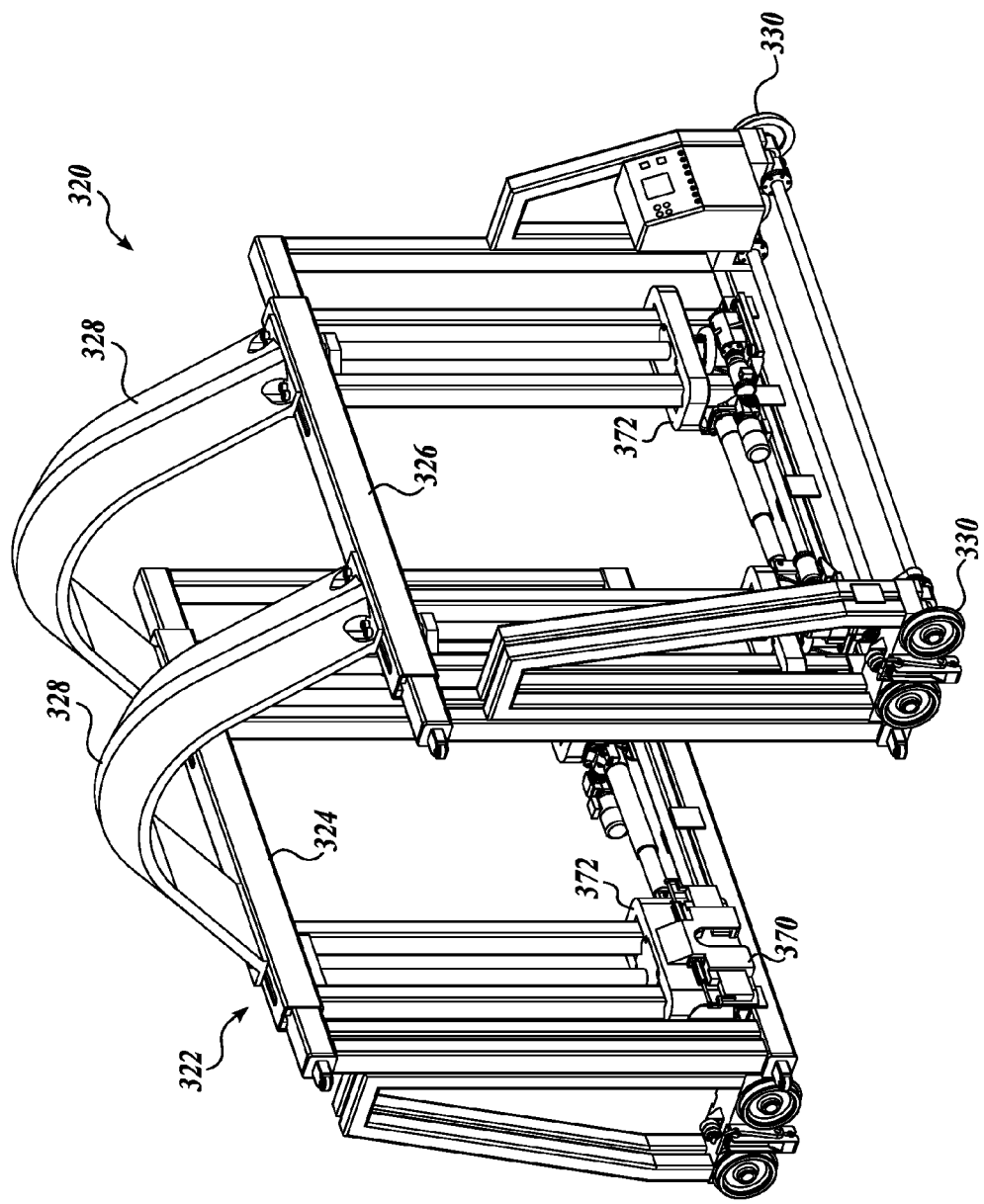
FIGS. 19-25 are isometric views showing a carriage assembly and the sequence steps of lifting a canister for loading into the top row of compartments of a high density HSM in accordance with another embodiment of the present disclosure.
Figure 20:
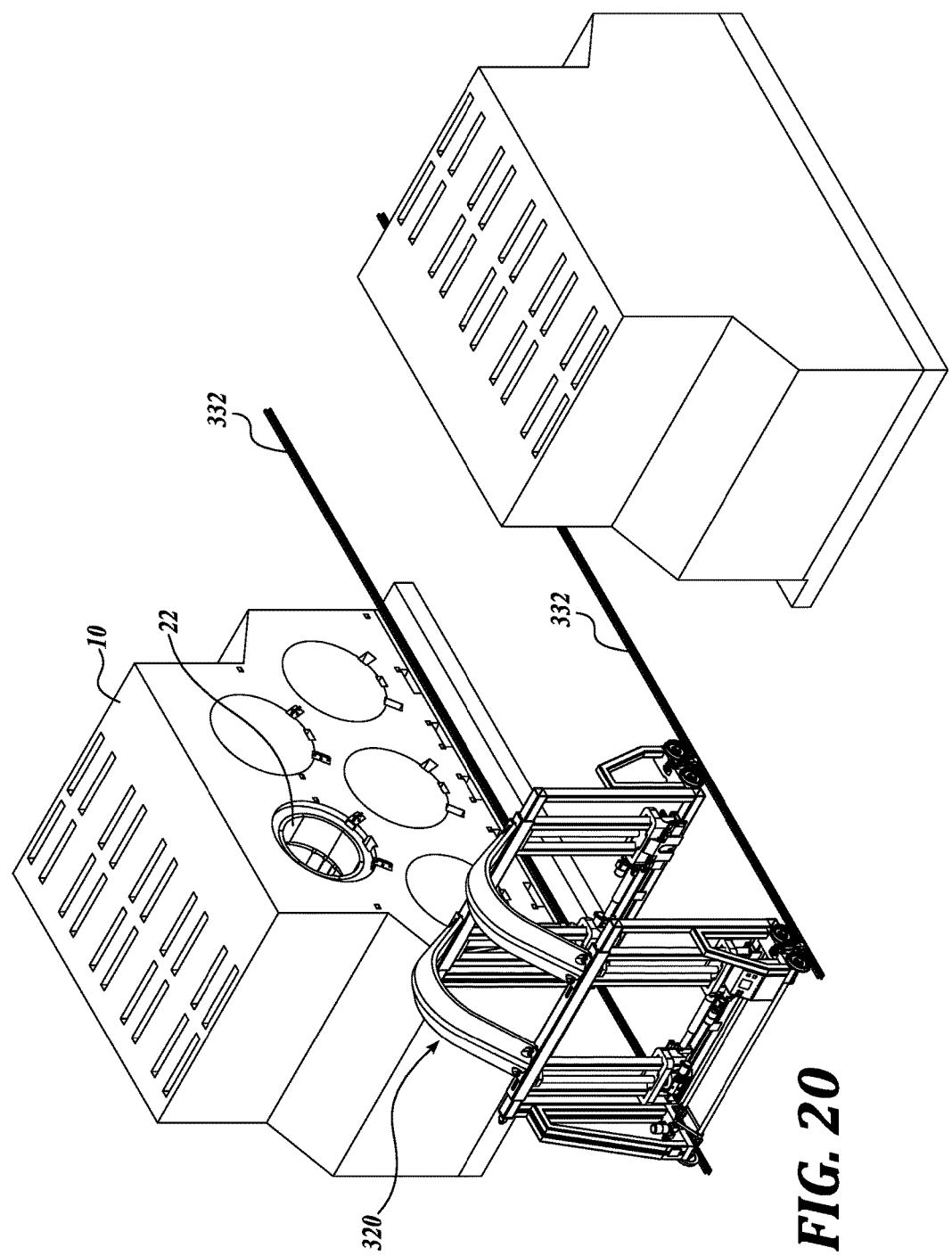
Figure 22:
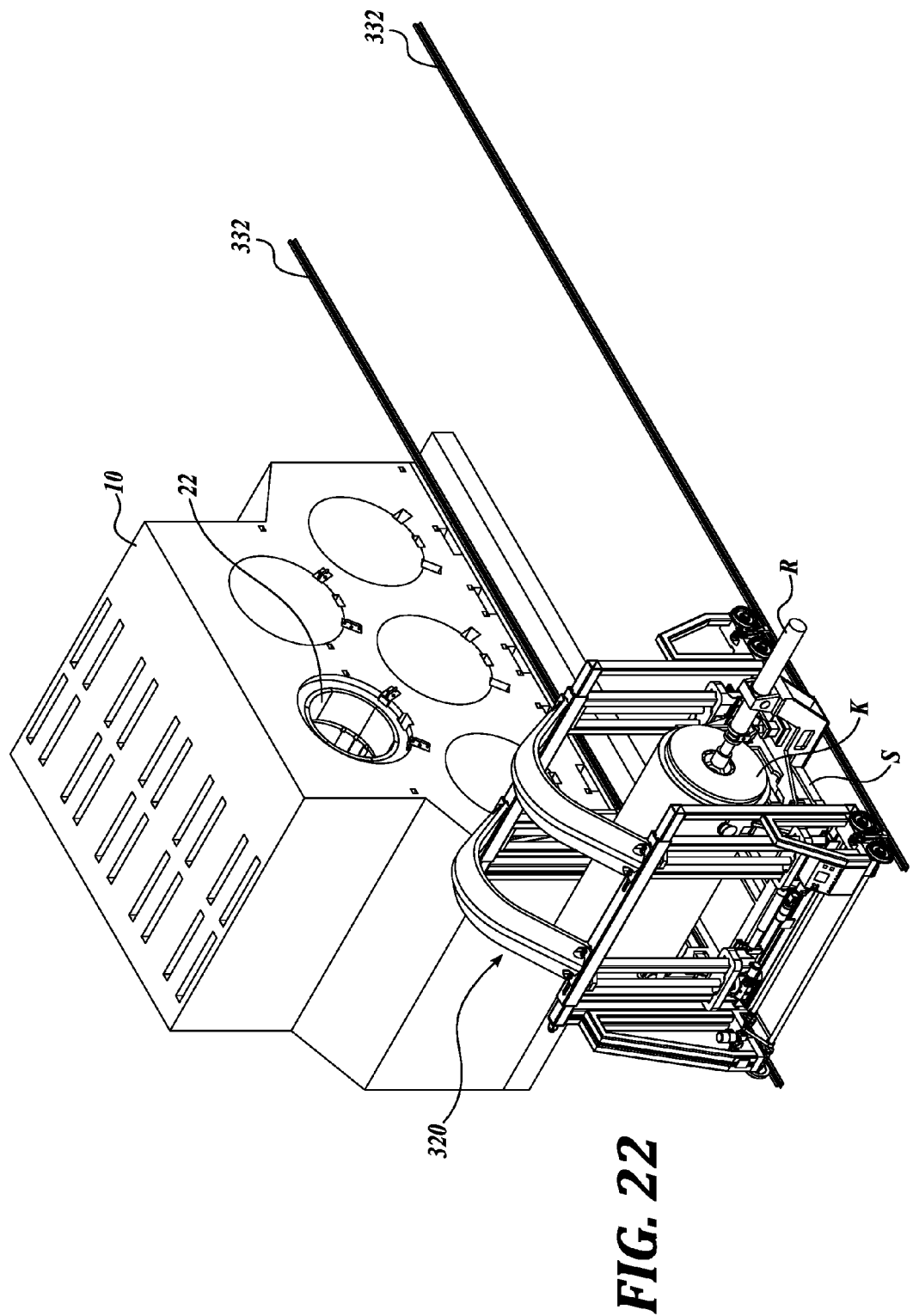
Figure 24:
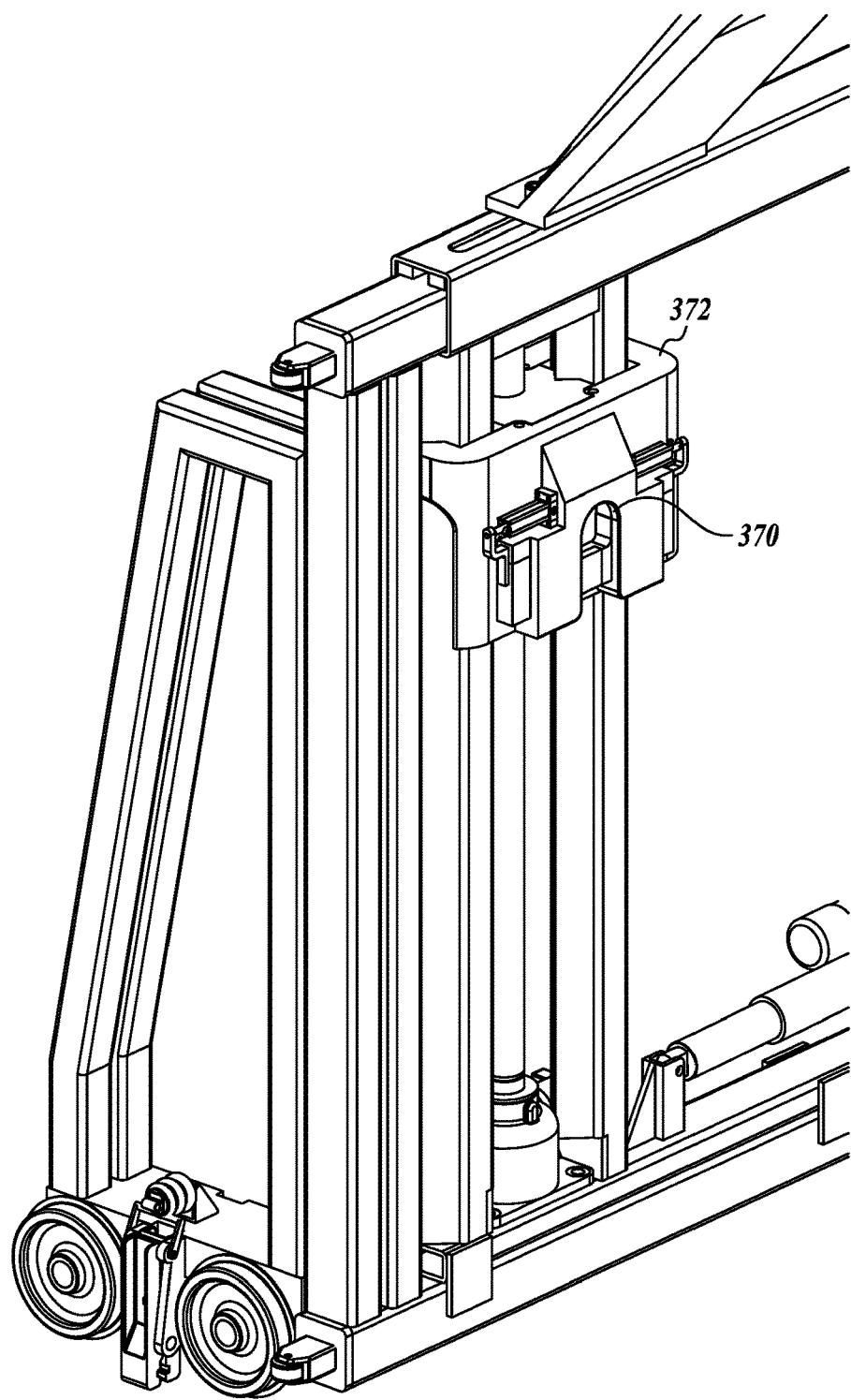

Referring to FIG. 22, the carriage assembly 320 engages with the skid S to secure the skid S within the carriage assembly 320 as the trailer T is removed from under the skid S and readied for alignment with a specific compartment 22 of the HSM 10. Referring to FIGS. 19 and 24, catchers 370 are configured to engage with trunnions (now shown) located on the transfer skid S. The catchers 370 are positioned in their top position (see FIG. 24), then the catchers 370 are lowered to engage with the trunnions on the transfer skid S (see FIG. 25). As the catchers 370 are lowered, they lockingly engage with the trunnions.

In one embodiment of the present disclosure, the carriage assembly 320 includes four catchers 370 to engage with four trunnions on the transfer skid S. Other numbers of catchers and trunnions are also within the scope of the present disclosure. Also, the catchers 370 may be configured to engage with the cask K or with the skid S. Other supporting arms of the carriage assembly 320 may also be brought into locking position as the skid S is supported by the carriage assembly 320.

Figure 23:
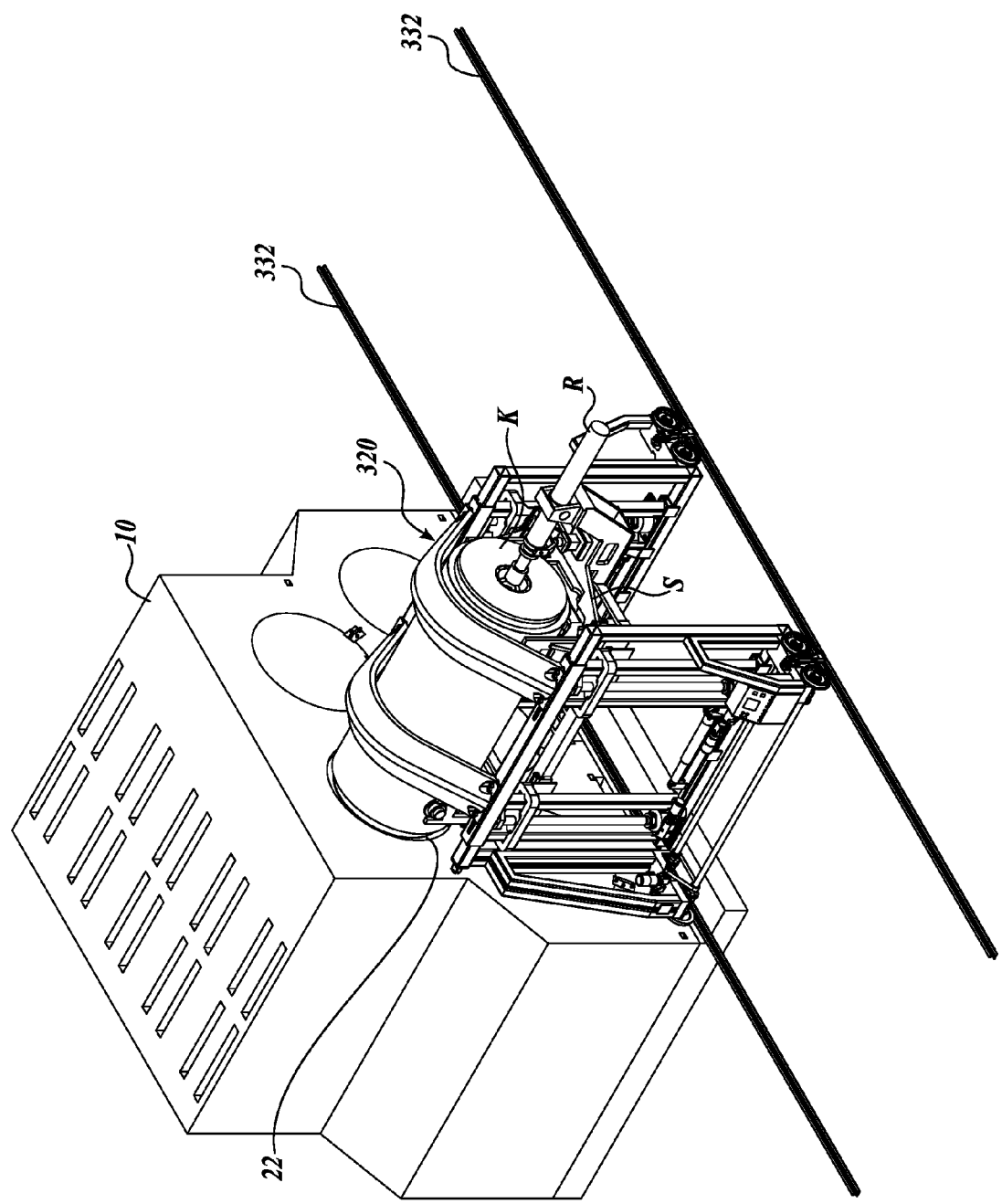

Referring to FIG. 23, the carriage assembly 320 is moved along the tracks 332 to position the cask K at a specific compartment 22 in the HSM 10. When the skid S and cask K are aligned, a linear actuator, shown as a telescoping ram device R extends and pushes the canister (not shown) out of the cask K and into the compartment 22 of the HSM 10.

In FIG. 20-23, the canister can be deposited into a compartment 22 in the lower row. However, the carriage assembly 320 is also configured for lifting the canister to upper level compartments 22 in the upper row (see FIG. 22).

Figure 25:
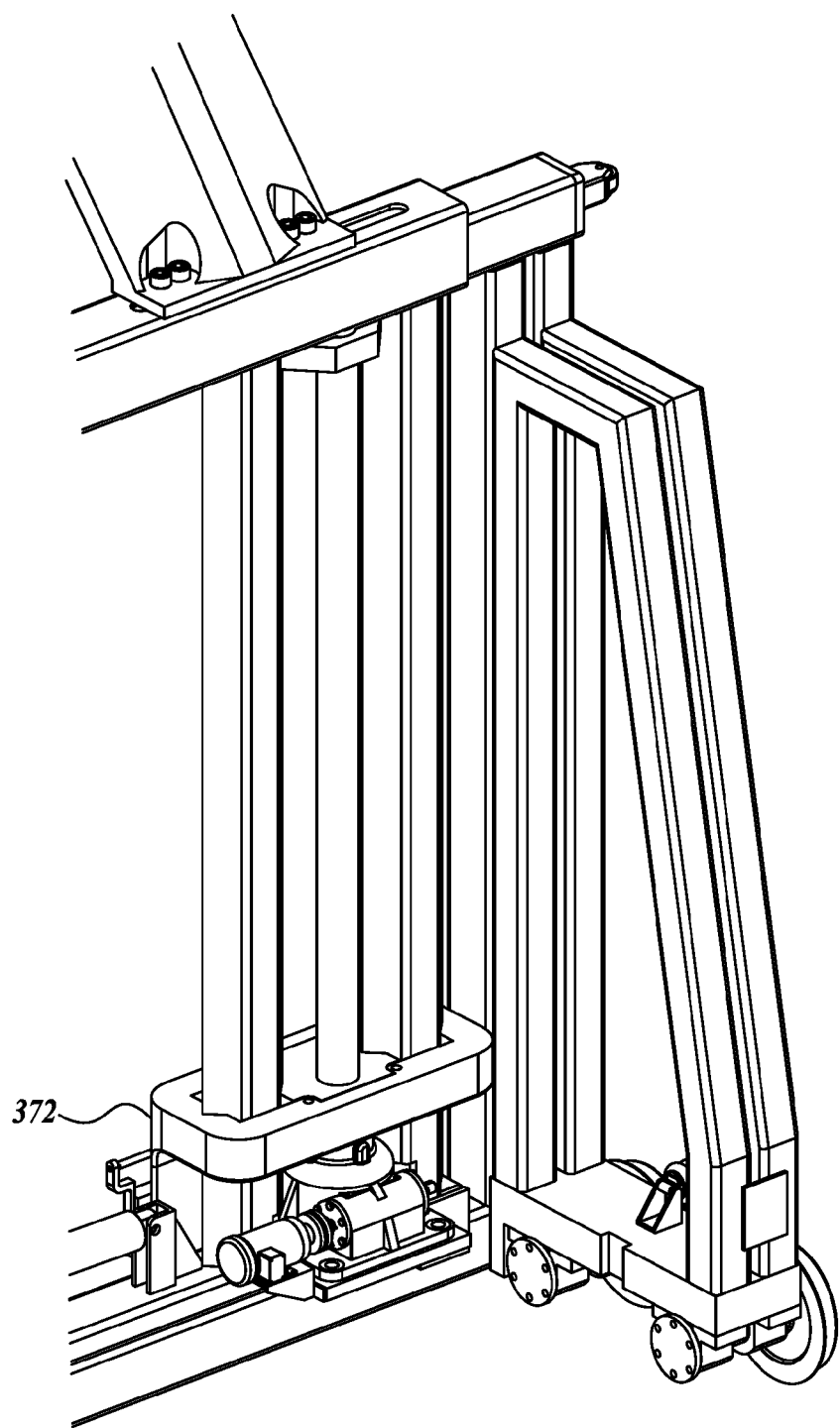

Referring to FIGS. 19, 24 and 25, lifting features of the carriage assembly 320 will now be described. The carriage assembly 120 includes a plurality of lifting devices 372 for use in moving the skid S and cask K between a first elevation position (see FIG. 25) to a second elevation position (see FIG. 24). Each of the four catchers 370 on the carriage assembly 320 is supported and moved vertically by a lifting device 372, such as a screw jack. Each jack may be driven by an electric or hydraulic motor. Other lifting systems are also within the scope of the present disclosure.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the disclosure in which an exclusive property or privilege is claimed are defined as follows:

1. A horizontal storage module (HSM) for storing a plurality of canisters containing a radioactive material, comprising:

a unitary body defining a plurality of compartments, each compartment configured for receiving one of the plurality of canisters, wherein the compartments comprise a first row of compartments at a first elevation and a second row of compartments at a second elevation higher than the first elevation, wherein the compartments are separated by dividing walls; and a plurality of canister supports fixed to the dividing walls and configured to support the plurality of canisters centrally within a corresponding one of the plurality of compartments such that the canisters are spaced from the dividing walls and canisters in the first row of compartments do not overlap vertically with canisters in the second row of compartments;

wherein a lower portion of the second row of compartments are at a lower elevation than an upper portion of the first row of compartments.

2. The HSM of claim 1, further comprising ventilation means in each of the plurality of compartments including vent paths having substantially vertical pathways.

3. The HSM of claim 1, wherein each compartment is adjacent at least two other compartments.

4. The HSM of claim 1, wherein each compartment is polygonal in cross-sectional shape.

5. The HSM of claim 1, wherein the compartments are pentagonal in cross-section.

6. The HSM of claim 1, wherein the plurality of compartments are arranged in a staggered configuration.

7. The HSM of claim 1, further comprising a roof on the body.

8. The HSM of claim 7, wherein the roof includes a plurality of outlet vents, wherein each outlet vent is in fluid communication with a corresponding one of the plurality of compartments.

9. The HSM of claim 7, wherein the roof is supported only by a front wall of the body and a back wall of the body.

10. The HSM of claim 1 further comprising a plurality of airflow pathways, wherein each airflow pathway extends from a lower inlet vent to a corresponding one of the plurality of compartments and from the corresponding compartment to an upper outlet vent.

11. The HSM of claim 1 further comprising a carriage assembly for lifting the canister to the second elevation.

12. The HSM of claim 1, wherein the body portion is modularized and made from a plurality of segments.

13. The HSM of claim 12, wherein the plurality of segments are vertically layered on top of each other.

14. The HSM of claim 12, wherein adjacent segments are attached to one another using only a vertical attachment system.

15. The HSM of claim 14, wherein the vertical attachment system includes a plurality of vertically oriented holes in the walls of adjacent segments, and ties connecting such holes.

16. The HSM of claim 1, wherein the canister supports comprise bearing blocks.

* * * * *